US012630788B1

(12) United States Patent
Coles et al.

(10) Patent No.: US 12,630,788 B1
(45) Date of Patent: May 19, 2026

(54) DUAL-FUNCTION ADDITIVES AND CLEANING COMPOSITIONS INCLUDING THE SAME

(71) Applicant: FutureFuel Chemical Company, Batesville, AR (US)

(72) Inventors: Beth Emerson Coles, Batesville, AR (US); Timothy A. Oster, Batesville, AR (US); Kelsey Llená LaCombe, Newark, AR (US)

(73) Assignee: FutureFuel Chemical Company, Batesville, AR (US)

( * ) Notice: Subject to any disclaimer, the term of this patent is extended or adjusted under 35 U.S.C. 154(b) by 213 days.

(21) Appl. No.: 18/376,527

(22) Filed: Oct. 4, 2023

Related U.S. Application Data

(60) Provisional application No. 63/413,306, filed on Oct. 5, 2022.

(51) Int. Cl.
*C11D 3/00* (2006.01)
*C11D 3/34* (2006.01)
*C11D 3/39* (2006.01)

(52) U.S. Cl.
CPC .......... *C11D 3/3418* (2013.01); *C11D 3/3915* (2013.01); *C11D 2111/16* (2024.01); *C11D 2111/18* (2024.01)

(58) Field of Classification Search
CPC .. C11D 3/3418; C11D 3/3915; C11D 2111/16
(Continued)

(56) References Cited

U.S. PATENT DOCUMENTS 3,812,044 A 5/1974 Connor et al.
3,864,286 A * 2/1975 Anderson ............ C11D 3/3418 510/357

(Continued)

FOREIGN PATENT DOCUMENTS

EP 0120591 B1 9/1987
EP 0350096 A2 1/1990
WO 2014/011849 A1 1/2014

OTHER PUBLICATIONS

STIC Search Report dated Sep. 12, 2025.*

(Continued)

*Primary Examiner* — Eisa B Elhilo
(74) *Attorney, Agent, or Firm* — Additon, Pendleton & Witherspoon, P.A.

(57) ABSTRACT

Acylated benzene sulfonated compounds with dual functionality can have the following structure:

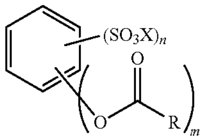

wherein each R is independently hydrogen or a C1 to C11 alkyl, each X is independently an alkali metal ion, an alkaline earth metal ion, and/or a quaternary ammonium cation, n is 1 to 3, and m is 1 to 2, with the proviso that when m is 2, the —OC(O)R groups are not located in an ortho configuration at positions 1 and 2 of the benzene ring. Cleaning compositions including the acylated benzene sulfonated compound are also disclosed.

29 Claims, 1 Drawing Sheet

(58) Field of Classification Search
USPC .......................................................... 510/495
See application file for complete search history.

(56) References Cited

U.S. PATENT DOCUMENTS

| | | | | |
|---|---|---|---|---|
| 4,283,301 | A | 8/1981 | Diehl | |
| 4,412,934 | A | 11/1983 | Chung et al. | |
| 7,585,376 | B2 * | 9/2009 | Scheibel | C11D 3/0036 510/357 |
| 8,399,396 | B2 | 3/2013 | Gardner et al. | |
| 8,921,299 | B2 | 12/2014 | Miracle et al. | |
| 10,844,142 | B2 | 11/2020 | Lu et al. | |
| 2011/0152222 | A1 * | 6/2011 | Sanchez | A61P 27/00 558/44 |
| 2014/0018279 | A1 * | 1/2014 | Song | C11D 3/0073 510/224 |
| 2014/0243252 | A1 | 8/2014 | Bymaster et al. | |

OTHER PUBLICATIONS

English Abstract of Kameonov, et al., "Effect of the nature of chemical substances on bactericidal activity", Tr. Tsentr. Nauchn.-Issled. Dezinfektsion Inst. (1963), (16), 56-61 [online], Retrieved from SciFinder, CAPLUS database, p. 1.

* cited by examiner

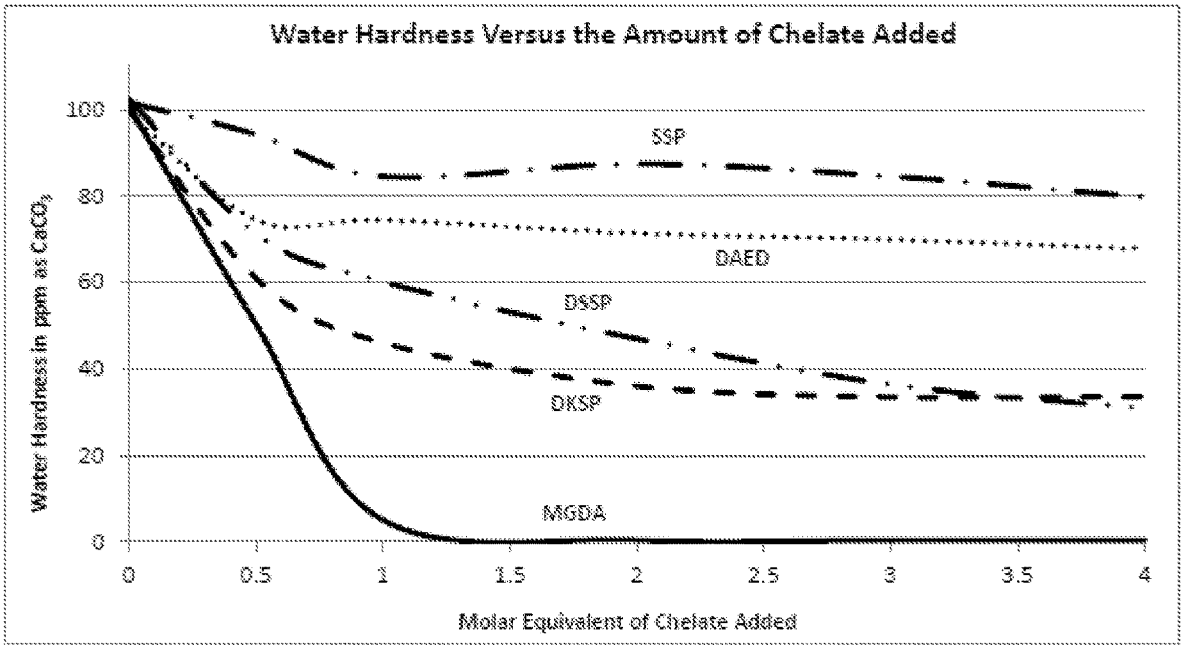
Water Hardness Versus the Amount of Chelate Added
Water Hardness in ppm as CaCO3
100
80
60
40
20
0
0
0.5
1
1.5
2
2.5
3
3.5
4
Molar Equivalent of Chelate Added
SSP
DAED
DSSP
DKSP
MGDA

DUAL-FUNCTION ADDITIVES AND CLEANING COMPOSITIONS INCLUDING THE SAME

CROSS-REFERENCE TO PRIORITY APPLICATIONS

This application hereby claims the benefit of U.S. Patent Application No. 63/413,306 filed Oct. 5, 2022, the entire disclosure of which is hereby incorporated by reference in its entirety.

FIELD

The present disclosure relates to additives for cleaning compositions and cleaning compositions including the same.

BACKGROUND

Hard water ions of calcium and magnesium can cause scale formation on surfaces that include dishes in dishwashing, fabrics in laundry, and other types of surfaces in household, industrial, and institutional (HI&I) applications. For automatic dishwashing (ADW) detergents, in particular, filming and spotting on glassware and tea stains on ceramics are visual cues as to the performance of the detergent. Given the limited mechanical action of the ADW cleaning process, the detergent formulation is important to mitigate potential issues of cleanliness and higher detergent dosages due to inefficient cleaning.

Chelating agents are additives in formulations, including, but not limited to, ADW detergents, laundry detergents, hard surface cleaners, etc., that sequester or chelate hard water ions of calcium and magnesium to enhance detergency and cleaning efficiency. Bleach activators, typically organic peracid precursors, are components added to the same formulations to enhance the bleaching action of difficult to remove stains, in particular tea stains.

Given the size and diversity of the HI&I industry, and its projected growth due to an increasing population and market establishment in previously undeveloped regions, competition exists to provide products at a reduced cost while maintaining or enhancing performance.

Accordingly, there is a need for an ADW detergent that minimizes components allowing for innovative and cost-effective formulation flexibility. Furthermore, there is a need for an ADW detergent comprising the dual benefit of "two-products-in-one," thereby assisting or eliminating some components in existing formulations.

SUMMARY

The present disclosure relates to dual-function additives for cleaning compositions. The dual-function additives can have the dual function of a chelator and bleach activator in one product. The dual-function additives exhibiting a combination of properties can provide manufacturers formulation flexibility, for example, to reduce costs while still maintaining performance.

The dual-function additives can include acylated benzene sulfonate compounds having the general structure of Formula I:

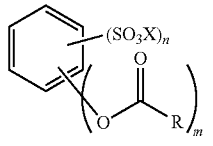

wherein:

each R is independently hydrogen or a C1 to C11 alkyl, each X is independently an alkali metal ion, an alkaline earth metal ion, and/or a quaternary ammonium cation, n is 1 to 3 (e.g., n is 1, 2, or 3), and m is 1 to 2 (e.g., m is 1 or 2), with the proviso that when m is 2, the —OC(O)R groups are not located in an ortho configuration at positions 1 and 2 of the benzene ring.

In some embodiments, the dual-function additives can include acylated benzene sulfonate compounds having the general structure of Formula Ia:

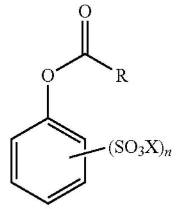

wherein:

R is hydrogen or a C1 to C11 alkyl, each X is independently an alkali metal ion, an alkaline earth metal ion, and/or a quaternary ammonium cation, and n is 2 or 3.

In some embodiments, the dual-function additives can include acylated benzene sulfonate compounds having the general structure of Formula Id:

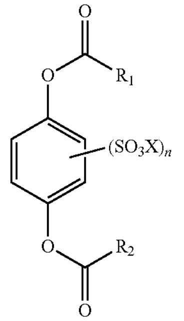

wherein:

$R_1$ is hydrogen or a C1 to C11 alkyl, $R_2$ is hydrogen or a C1 to C11 alkyl, each X is independently an alkali metal ion, an alkaline earth metal ion, and/or a quaternary ammonium cation, and n is 1 or 2.

The present disclosure also relates to compositions including acylated benzene sulfonate compounds described herein, for example, cleaning compositions. Non-limiting examples of the cleaning compositions include dishwashing detergents (e.g., ADW detergents), laundry detergents, surface cleaners, and the like.

The present disclosure also relates to methods of cleaning articles (e.g., tableware, laundry, surfaces, etc.) utilizing the cleaning composition.

Although not wishing to be bound by any theory or explanation of the disclosure, it is currently believed that when the acylated benzene sulfonates are combined with a peroxide source, sulfonated benzene derivatives and peracid are generated. This can provide dual benefits in cleaning compositions (e.g., ADW detergents), such as reduced filming and/or spotting on glassware through action as a chelator and facilitated stain and/or soil removal, e.g., tea stain removal from ceramics, through action as a bleach activator. Additionally, it has surprisingly been determined that the amount of conventional chelator can be reduced and/or that conventional bleach activator can be substituted in ADW detergents due to the dual-function additive of the present disclosure. The dual-function additive of the present disclosure accordingly allows a single component to provide the aforementioned benefits.

BRIEF DESCRIPTION OF THE DRAWING

The drawing is provided as an example. The present invention may be embodied in many different forms and should not be construed as limited to the example depicted in the drawing.

The FIGURE is a graph depicting results of hard water chelation tests conducted for para-sodiosulfophenol (SSP), diacetylethylenediamine (DAED), disodiosulfophenol (DSSP), dipotassiosulfophenol (DKSP), and methyl-glycine-diacetic acid (MGDA).

DETAILED DESCRIPTION

In this detailed description, various aspects and features are herein described to provide a thorough understanding of the present disclosure. It will be apparent, however, to those having ordinary skill in the art that the disclosed additives, compositions, and methods might be achieved without some or all of these specific details. As another example, features disclosed as part of one embodiment can be used in another embodiment to yield a further embodiment. In some instances, well-known aspects have not been described in detail to avoid unnecessarily obscuring the present disclosure. This detailed description is therefore not to be taken in a limiting sense, and it is intended that other embodiments are within the spirit and scope of the present disclosure.

The dual-function additives of the present disclosure can exhibit the dual functions of a chelator and bleach activator in one product.

The dual-function additive can include an acylated benzene sulfonate compound that may function as both a chelating agent and a bleach activator having the general structure of Formula I:

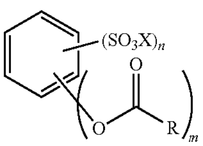

wherein:

each R is independently hydrogen or a C1 to C11 alkyl, each X is independently an alkali metal ion, an alkaline earth metal ion, and/or a quaternary ammonium cation, n is 1 to 3 (e.g., n is 1, 2, or 3), and m is 1 to 2 (e.g., m is 1 or 2), with the proviso that when m is 2, the —OC(O)R groups are not located in an ortho configuration at positions 1 and 2 of the benzene ring.

In some embodiments, the dual-function additive comprises a compound of Formula I with the proviso that when m is 2 and the —OC(O)R groups are located in a meta configuration at positions 1 and 3 of the benzene ring, then n is 1 or 3.

In some embodiments, the dual-function additive comprises a compound of Formula I with the proviso that when m is 1, then n is 2 or 3.

In some embodiments, the dual-function additive comprises a compound of Formula I with the proviso that when m is 2, then the —OC(O)R groups are not located in an ortho configuration at positions 1 and 2 of the benzene ring; when m is 2 and the —OC(O)R groups are located in a meta configuration at positions 1 and 3 of the benzene ring, then n is 1 or 3; and/or when m is 1, then n is 2 or 3.

As used herein, unless otherwise defined, C1 to C11 alkyl includes C1 to C11 straight chain and/or branched alkyl groups.

Each R, $R_1$, and/or $R_2$ can be the same or different. Each X also can be the same or different.

Examples of R, $R_1$, and/or $R_2$ can include without limitation hydrogen, methyl, ethyl, propyl, pentyl, hexyl, heptyl octyl, nonyl, decyl, and/or undecyl. In some embodiments, one or more R, $R_1$, and/or $R_2$ can be hydrogen. In some embodiments, each R, $R_1$, and/or $R_2$ can be hydrogen. In other embodiments, one or more R, $R_1$, and/or $R_2$ can be C1 to C11 alkyl, for example, one or more R, $R_1$, and/or $R_2$ can be C1 to C3 alkyl, for example one or more R, $R_1$, and/or $R_2$ can be methyl. In some embodiments, each R, $R_1$, and/or $R_2$ can be C1 to C11 alkyl, for example, each R, $R_1$, and/or $R_2$ can be C1 to C3 alkyl, for example, each R, $R_1$, and/or $R_2$ can be methyl.

In some embodiments, one or more (e.g., each) X can be the same or different alkali metal ion. Examples of the alkali metal ion can include without limitation sodium, potassium, rubidium, and/or cesium. In exemplary embodiments, one or more (e.g., each) alkali metal ion can be sodium and/or potassium (e.g., each alkali metal ion can be sodium).

In some embodiments, one or more (e.g., each) X can be the same or different alkaline earth metal ion. Examples of the alkaline earth metal ion can include without limitation magnesium, calcium, strontium, and/or barium. In exemplary embodiments, one or more (e.g., each) alkaline earth metal ion can be magnesium.

In some embodiments, one or more (e.g., each) X can be the same or different quaternary ammonium cation. Quaternary ammonium cations are well known in the art. The quaternary ammonium cations can include compounds of formula $NR'_4{}^+$ wherein each R' can be the same or different. Examples of R' can include without limitation C1 to C30 alkyl, C2 to C30 alkenyl, C6 to C30 aryl, and/or aralkyl. "Aralkyl" can be defined as R"-aryl, wherein R" is a C1 to C30 alkylene chain and aryl is as defined herein. In some embodiments, one or more (e.g., each) quaternary ammonium cation can include tetrabutyl ammonium.

As used herein, reference to "n is 1 to 3" includes embodiments wherein n is 1, 2, or 3; reference to "n is 1 to 2" includes embodiments wherein n is 1 or 2; reference to "n is 2 to 3" includes embodiments wherein n is 2 or 3; and reference to "m is 1 to 2" includes embodiments wherein m is 1 or 2.

In exemplary embodiments, m of Formula I above can be 1. For example, the dual-function additive can be an acylated benzene sulfonate compound that may function as both a chelating agent and a bleach activator having the general structure of Formula Ia:

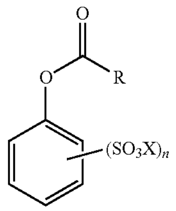

wherein:

R is hydrogen or a C1 to C11 alkyl (for example, R is hydrogen or $C_1$ to $C_3$ alkyl, as another example R is hydrogen or methyl, as another example R is methyl), each X is independently an alkali metal ion, an alkaline earth metal ion, and/or a quaternary ammonium cation (for example, each X is an alkali metal ion, as another example each X is sodium and/or potassium, as another example each X is sodium), and n is 1 to 3 (e.g., nis 1, 2, or 3, for example n is 2 or 3).

As a non-limiting example, wherein the acylated benzene sulfonate compound has the general structure of Formula Ia, when n is 1, the sulfonate group can be in a para configuration at position 4 of the benzene ring. As another non-limiting example wherein the acylated benzene sulfonate compound has the general structure of Formula Ia, when n is 2, the sulfonate groups can be in ortho and para configurations at positions 2 and 4 of the benzene ring. In yet another non-limiting example wherein the acylated benzene sulfonate compound has the general structure of Formula Ia, when n is 3, the sulfonate groups can be in ortho and para configurations at positions 2, 4, and 6 of the benzene ring.

In some embodiments wherein the acylated benzene sulfonate compound has the general structure of Formula Ia, R is hydrogen or methyl, each X is an alkali metal ion, n is 2, and —$SO_3X$ is substituted on positions 2 and 4 of the benzene ring. In some embodiments wherein the acylated benzene sulfonate compound has the general structure of Formula Ia, R is hydrogen or methyl, each X is an alkali metal ion, n is 3, and —$SO_3X$ is substituted on positions 2, 4, and 6 of the benzene ring.

In an exemplary embodiment of compounds that may function as both a chelating agent and a bleach activator shown below represented by Formula Ib, the sulfonate groups are in ortho and para configurations located at positions 2 and 4 with X as a potassium cation:

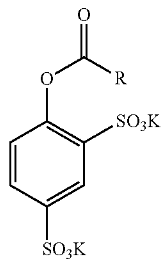

In another exemplary embodiment of compounds that may function as both a chelating agent and a bleach activator shown below represented by Formula Ie, the sulfonate groups are in ortho and para configurations located at positions 2 and 4 with X as a sodium cation:

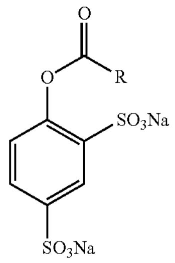

In exemplary embodiments such as illustrated by Formula Ib and Formula Ie above, R can be hydrogen. In other exemplary embodiments such as illustrated by Formula Ib and Formula Ie above, R can be C1 to C11 alkyl, for example $C_1$ to $C_3$ alkyl, for example methyl.

Below are examples of compounds that may function as both a chelating agent and a bleach activator of Formulas Ib and Ie, wherein R is methyl and X is potassium or sodium, respectively:

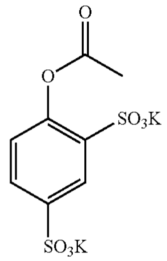 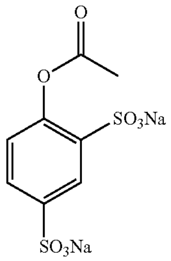

In other exemplary embodiments, m of Formula I above can be 2.

For example, when m of Formula I is 2, the acylated benzene sulfonate can be a compound that may function as both a chelating agent and a bleach activator having the general structure of Formula Ic:

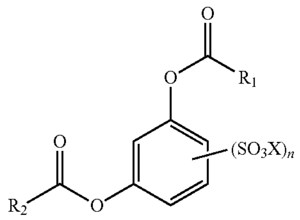

wherein:

$R_1$ is hydrogen or a C1 to C11 alkyl (for example, $R_1$ is hydrogen or $C_1$ to $C_3$ alkyl, as another example $R_1$ is hydrogen or methyl, as another example $R_1$ is methyl), $R_2$ is hydrogen or a C1 to C11 alkyl (for example, $R_2$ is hydrogen or $C_1$ to $C_3$ alkyl, as another example $R_2$ is hydrogen or methyl, as another example $R_2$ is methyl), each X is independently an alkali metal ion, an alkaline earth metal ion, and/or a quaternary ammonium cation (for example, each X is an alkali metal ion, as another example each X is sodium and/or potassium, as another example each X is sodium), and n is 1 to 3 (e.g., nis 1, 2, or 3, for example n is 1 or 3).

In this embodiment as illustrated above wherein the acylated benzene sulfonate compound has the general structure of Formula Ic, the acylated groups are in a meta configuration at positions 1 and 3 of the benzene ring. In some embodiments, when m is 2 and the acylated groups (e.g., —OC(O)$R_1$ and/or (—OC(O)$R_2$ groups) are located in a meta configuration at positions 1 and 3 of the benzene ring as illustrated in Formula Ic above, n can be is 1 or 3. $R_1$ can be the same or different from $R_2$. As used herein, unless otherwise defined, $R_1$ and $R_2$ are the same as R as defined herein, for example, $R_1$ and $R_2$ can be the same or different and can be independently hydrogen and/or C1 to C11 linear and/or branched alkyl.

In a non-limiting example wherein the acylated benzene sulfonate compound has the general structure of Formula Ic, when n is 1, the sulfonate group can be substituted on position 4 of the benzene ring. As another non-limiting example wherein the acylated benzene sulfonate compound has the general structure of Formula Ic, when n is 2, the sulfonated groups can be substituted on positions 4 and 6 of the benzene ring. As yet another non-limiting example wherein the acylated benzene sulfonate compound has the general structure of Formula Ic, when n is 3, the sulfonated groups can be substituted on positions 2, 4, and 6 on the benzene ring.

As another example, when m of Formula I is 2, the acylated benzene sulfonate can be a compound that may function as both a chelating agent and a bleach activator having the general structure of Formula Id:

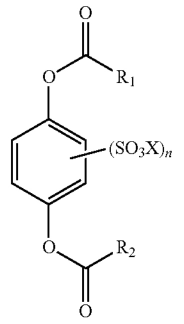

wherein:

$R_1$ is hydrogen or a C1 to C11 alkyl (for example, $R_1$ is hydrogen or $C_1$ to $C_3$ alkyl, as another example $R_1$ is hydrogen or methyl, as another example $R_1$ is methyl), $R_2$ is hydrogen or a C1 to C11 alkyl (for example, $R_2$ is hydrogen or $C_1$ to $C_3$ alkyl, as another example $R_2$ is hydrogen or methyl, as another example $R_2$ is methyl), each X is independently an alkali metal ion, an alkaline earth metal ion, and/or a quaternary ammonium cation (for example, each X is an alkali metal ion, as another example each X is sodium and/or potassium, as another example each X is sodium, as another example each X is potassium), and n is 1 to 2 (e.g., n is 1 or 2).

In this embodiment as illustrated above wherein the acylated benzene sulfonate compound has the general structure of Formula Id, the acylated groups are in a para configuration at positions 1 and 4 of the benzene ring. $R_1$ can be the same or different from $R_2$. In a non-limiting example of this embodiment wherein the acylated benzene sulfonate compound has the general structure of Formula Id, when n is 1, the sulfonate group can be substituted on position 2 of the benzene ring. As another non-limiting example wherein the acylated benzene sulfonate compound has the general structure of Formula Id, when n is 2, the sulfonate groups can be substituted on positions 2 and 5 of the benzene ring.

In some embodiments wherein the acylated benzene sulfonate compound has the general structure of Formula Id, each $R_1$ and $R_2$ can be methyl, n can be 1, X can be an alkali metal ion (for example X can be sodium or X can be potassium), and —$SO_3X$ can be substituted on position 2 of the benzene ring. In some embodiments wherein the acylated benzene sulfonate compound has the general structure of Formula Id, each $R_1$ and $R_2$ can be methyl, n can be 2, each X can be an alkali metal ion (for example each X can be sodium or each X can be potassium), and —$SO_3X$ is substituted on positions 2 and 5 of the benzene ring.

Below is an example of a compound that may function as both a chelating agent and a bleach activator of Formula Id, wherein $R_1$ and $R_2$ are each methyl, n is 1, X is potassium, and $SO_3X$ is substituted on position 2 of the benzene ring:

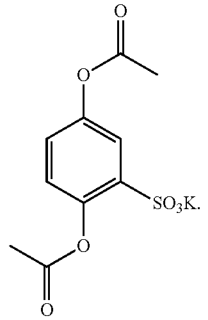

Below is an example of a compound that may function as both a chelating agent and a bleach activator of Formula Id, wherein $R_1$ and $R_2$ are each methyl, n is 1, X is sodium, and $SO_3X$ is substituted on position 2 of the benzene ring:

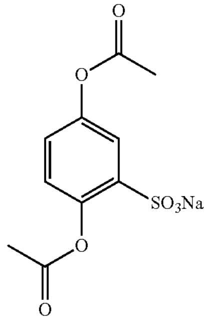

Below is an example of a compound that may function as both a chelating agent and a bleach activator of Formula Id, wherein $R_1$ and $R_2$ are each methyl, n is 2, each X is potassium, and each $SO_3X$ is substituted on positions 2 and 5 of the benzene ring:

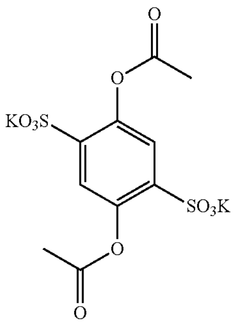

Below is an example of a compound that may function as both a chelating agent and a bleach activator of Formula Id, wherein $R_1$ and $R_2$ are each methyl, n is 2, each X is sodium and each $SO_3X$ is substituted on positions 2 and 5 of the benzene ring:

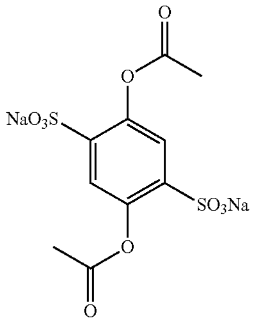

In some embodiments, the acylated benzene sulfonate can be a compound having the general structure of Formula If:

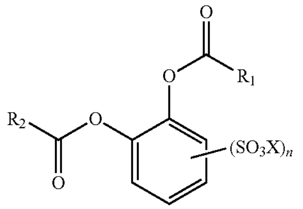

wherein:

$R_1$ is hydrogen or a C1 to C11 alkyl, $R_2$ is hydrogen or a C1 to C11 alkyl, each X is independently an alkali metal ion, an alkaline earth metal ion, and/or a quaternary ammonium cation, and n is 1 to 2 (e.g., n is 1 or 2).

In this embodiment wherein the acylated benzene sulfonate can be a compound having the general structure of Formula If as illustrated above, the acylated groups are in an ortho configuration at positions 1 and 2 of the benzene ring. $R_1$ can be the same or different from $R_2$. In a non-limiting example of this embodiment, wherein the acylated benzene sulfonate compound has the general structure of Formula If, when n is 1, the sulfonate group can be substituted on position 4 of the benzene ring. As another non-limiting example wherein the acylated benzene sulfonate compound has the general structure of Formula If, when n is 2, the sulfonate groups can be substituted on positions 4 and 6 of the benzene ring.

As discussed herein, the dual-function additives can have the dual function of a chelator and bleach activator in one product. When the dual-function additive has the dual function of a chelator and bleach activator in one product, the dual-function acylated benzene sulfonate of the present disclosure undergoes perhydrolysis in the presence of a peroxide source (e.g., when combined with a peroxide source and water) to form a bleach activator and a chelator. An exemplary perhydrolysis is depicted below for the dual-function additive of Formula I.

As discussed in more detail herein, a peroxide source can include, for example, hydrogen peroxide and/or a persalt that releases hydrogen peroxide in water. Although not wishing to be bound by any theory or explanation of the invention, it is currently believed that hydrogen peroxide can be converted to the perhydroxyl anion and that the perhydroxyl anion can attack the dual function acylated benzene sulfonate compound of Formula I to form a chelator and a bleach activator as depicted below. It is noted that when m is two, 2 equivalents of bleach activator is produced:

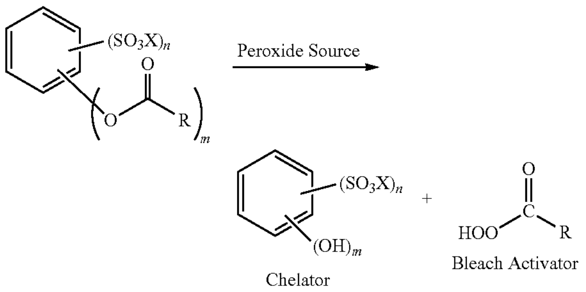

Other exemplary perhydrolysis reactions are depicted below (again, when m is two, then 2 equivalents of bleach activator is produced):

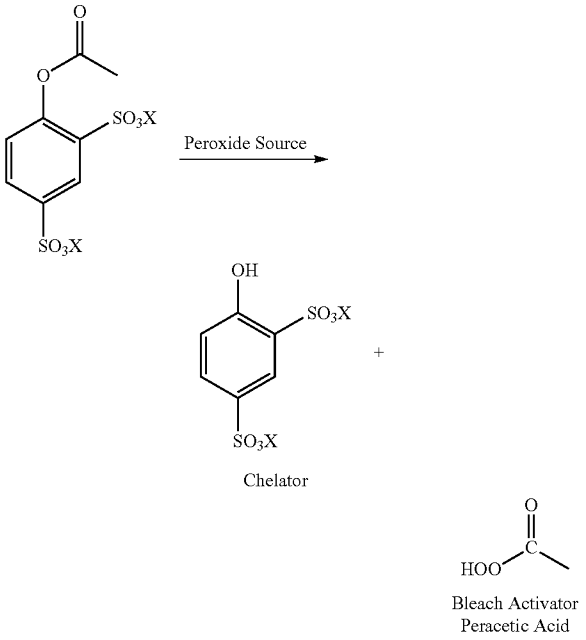

-continued

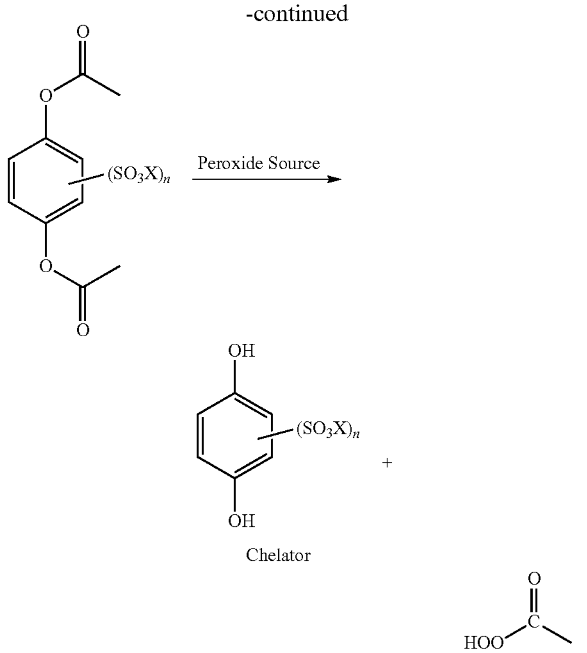

Chelator

Bleach Activator
Peracetic Acid

The dual-function acylated benzene sulfonate of the present disclosure can be prepared through the steps of:

(1) sulfonating a hydroxybenzene and/or a dihydroxybenzene to give a hydroxybenzene sulfonic acid and/or a dihydroxybenzene sulfonic acid;

(2) neutralizing the hydroxybenzene sulfonic acid and/or the dihydroxybenzene sulfonic acid to form a hydroxybenzene sulfonate and/or a dihydroxybenzene sulfonate; and (3) esterifying the hydroxybenzene sulfonate and/or the dihydroxybenzene sulfonate to yield an acylated benzene sulfonate and/or a diacylated benzene sulfonate.

The sulfonating step can be conducted by combining the hydroxybenzene and/or dihydroxybenzene with a suitable sulfonic acid source under conditions selected to sulfonate the hydroxybenzene and/or the dihydroxybenzene to form hydroxybenzene sulfonic acid and/or the dihydroxybenzene sulfonic acid. Examples of the sulfonic acid source can include without limitation oleum ("fuming sulfuric acid" having a concentration of 10 wt % to 65 wt %, for example, 20 wt % to 60 wt %, and as another for example 30 wt %) and/or pure $SO_3$. The equivalents of $SO_3$ can vary, for example, can range from 0.9 to 2.4 based on the initial hydroxy benzene compound being sulfonated, without being limited thereto.

In non-limiting embodiments, the hydroxybenzene and/or dihydroxybenzene can be heated to a temperature selected to maintain the hydroxybenzene and/or dihydroxybenzene in a molten state. The sulfonic acid source can be added to the molten hydroxybenzene and/or dihydroxybenzene at a suitable temperature, for example, from 50° C. to 120° C., to form a reaction mixture. The reaction mixture (the hydroxybenzene and/or dihydroxybenzene and the sulfonic acid source) can be maintained at a temperature and time sufficient to provide a sulfonation mixture including hydroxybenzene sulfonic acid and/or dihydroxybenzene sulfonic acid. For example, the reaction mixture can be maintained at a temperature of 80° C. to 120° C. for 1 hour to 10 hours. The sulfonation mixture can be maintained or cooled to a temperature of, for example, from 50° C. to 120° C.

The neutralizing step can be conducted by reacting the hydroxybenzene sulfonic acid and/or the dihydroxybenzene sulfonic acid with a suitable cation producing compound (e.g., an alkali metal cation producing compound, an alkaline earth metal cation producing compound, and/or a quaternary ammonium cation producing compound) under conditions sufficient to form a salt of the hydroxybenzene sulfonic acid and/or the dihydroxybenzene sulfonic acid.

Examples of alkali metal and/or alkaline earth metal cation producing compounds can include, without limitation, metal hydroxides, organic metal salts such as metal acetates, and inorganic metal salts such as metal carbonates and bicarbonates, metal halides, metal oxides, and metal sulfates, and the like, and mixtures thereof.

In exemplary embodiments, the alkali metal of the alkali metal producing cation can be sodium and/or potassium. In exemplary embodiments, the alkali metal cation producing compound can be sodium hydroxide (NaOH). In other exemplary embodiments, the alkali metal cation producing compound can be potassium hydroxide (KOH).

In some embodiments, the cation producing compound can be in the form of a caustic solution, prepared for example by mixing of 1 to 1.5 equivalents of the cation producing compound per equivalent of sulfonic acid with water. The skilled artisan will appreciate that solid forms of the cation forming compound can also be used in the neutralizing step.

The sulfonated mixture from the sulfonating step can be combined with the cation producing compound (e.g., the caustic solution and/or solid form thereof) under conditions suitable for salt formation (e.g., for formation of the hydroxybenzene sulfonate and/or the dihydroxybenzene sulfonate), for example, at a temperature of 5° C. to 110° C.

The salt can be recovered using techniques known in the art. For example, a reaction product including the salt can be cooled, for example to a temperature of 0° C. to 30° C.; washed using a solvent one, two, or more times as needed; and dried, for example, to provide a solid product. Solvents useful for the washing step are known and can include without limitation acetone, methanol, and the like, and mixtures thereof.

The esterifying step can be conducted by esterifying the hydroxybenzene sulfonate and/or the dihydroxybenzene sulfonate with a C1 to C11 straight chain and/or branched carboxylic acid and/or a C1 to C11 straight chain and/or branched carboxylic acid derivative thereof (i.e., a derivative of the C1 to C11 straight chain and/or branched carboxylic acid) under conditions to provide an acylated benzene sulfonate and/or a diacylated benzene sulfonate. Examples of the C1 to C11 straight chain and/or branched carboxylic acid include without limitation formic acid, acetic acid, proprionic acid, butyric acid, isobutyric acid, valeric acid, isovaleric acid, caproic acid, enanthic acid, caprylic acid, nonanoic acid, decanoic acid, and/or undecanoic acid. Examples of the C1 to C11 straight chain and/or branched carboxylic acid derivative thereof include without limitation acid halides, acid anhydrides (e.g., acetic anhydride), and/or esters derivatives of the C1 to C11 straight chain and/or branched carboxylic acid (e.g., acid halides, acid anhydrides and/or esters derivatives of formic acid, acetic acid, proprionic acid, butyric acid, isobutyric acid, valeric acid, isovaleric acid, caproic acid, enanthic acid, caprylic acid, nonanoic acid, decanoic acid, and/or undecanoic acid) as known in the art.

In exemplary embodiments, the ratio of the weight of C1 to C11 straight chain and/or branched carboxylic acid and/or C1 to C11 straight chain and/or branched carboxylic acid derivative that is used as the solvent compared to the weight of the hydroxybenzene sulfonate and/or the dihydroxybenzene sulfonate can range from 0:1 up to 2:1, without being limited thereto. The moles of C1 to C11 straight chain and/or branched carboxylic acid and/or C1 to C11 straight chain and/or branched carboxylic acid derivative, e.g., C1 to C11 straight chain and/or branched carboxylic acid anhydride, that is used as the reactant compared to the moles of the hydroxybenzene sulfonate and/or the dihydroxybenzene sulfonate can range from 0.5:1 up to 6:1, without being limited thereto.

In exemplary embodiments, the esterifying step can be conducted at a temperature and time sufficient to provide the esterified product, for example, 50° C. to 100° C. for 1 to 5 hours, without being limited thereto. The esterifying step can also be conducted in the presence of a suitable acid catalyst, for example but not limited to 1 mole % to 20 mole % sulfuric acid based on the hydroxybenzene sulfonate and/or the dihydroxybenzene sulfonate added. Following esterification, an acid neutralizing agent can be added in an amount and for a time sufficient to neutralize the acid catalyst. The mixture including the esterified product can be cooled, for example to a temperature of 0° C. to 50° C.

The acylated benzene sulfonate and/or a diacylated benzene sulfonate can be recovered, for example, by mixing a reaction product including the acylated benzene sulfonate and/or a diacylated benzene sulfonate with a solvent to form a slurry, and heating, cooling, and filtering the slurry to provide a solid product. These steps can be conducted one, two, or more times as needed. Suitable solvents are known, and examples thereof can include without limitation acetic acid, acetone, methanol, and the like, and mixtures thereof.

In some embodiments, the reaction product including the acylated benzene sulfonate and/or a diacylated benzene sulfonate can be mixed with a suitable solvent to form a slurry; the slurry can be heated, for example at a temperature from 50° C. to 100° C. for 1 hour to 12 hours; the slurry cooled and filtered; and then reslurried one, two or more times; followed by drying to provide a solid product. Again, suitable solvents can include without limitation acetic acid, acetone, methanol, and the like, and mixtures thereof.

An exemplary process for the production of an acylated benzene sulfonate according to the present disclosure is schematically illustrated below, including steps (1) sulphonating, (2) neutralizing, and (3) esterifying as described herein. In the schematic below, each X and R is the same as defined herein (each X is independently an alkali metal ion, an alkaline earth metal ion, and/or a quaternary ammonium cation and each R is independently hydrogen or C1 to C11 straight chain and/or branched alkyl):

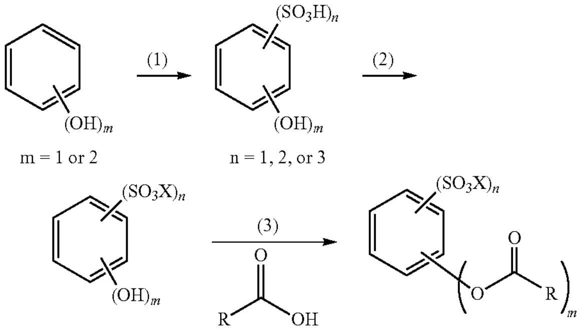

An exemplary process for the production of an acylated benzene sulfonate according to the present disclosure wherein R is methyl and X is potassium is schematically illustrated below:

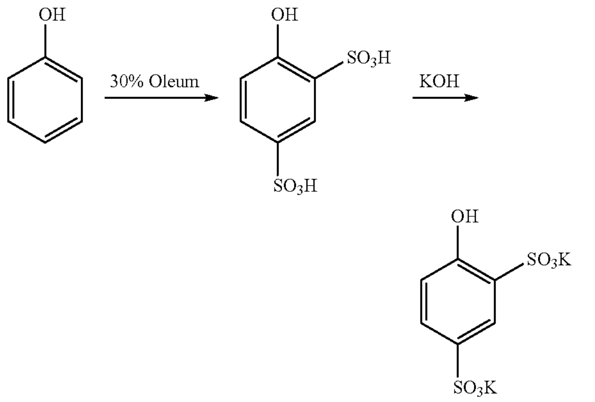

Dipotassiosulfophenol (DKSP)

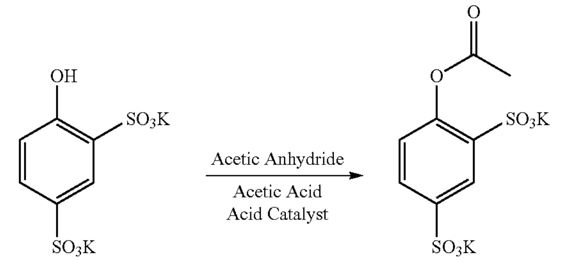

Dipotassiosulfophenol (DKSP)

Acetylated Dipotassiosulfophenol (AcDKSP)

An exemplary process for the production of an acylated benzene sulfonate according to the present disclosure wherein R is methyl and X is sodium is schematically illustrated below:

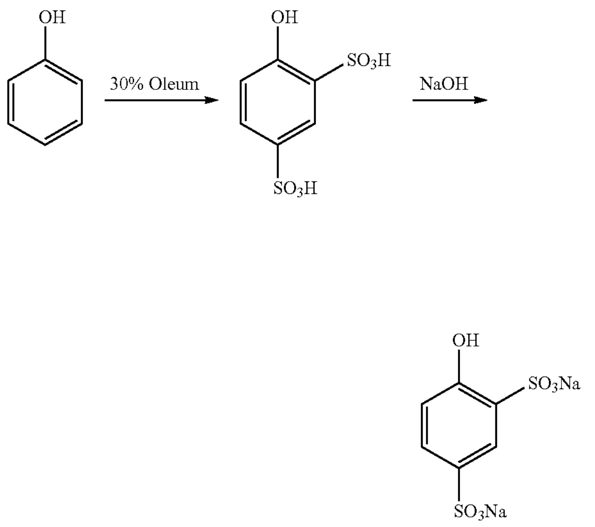

Disodiosulfophenol (DSSP)

-continued

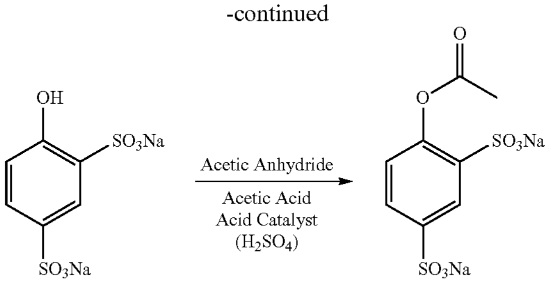

Disodiosulfophenol (DSSP)

Acetylated Disodiosulfophenol (AcDSSP)

Those skilled in the art will recognize that the steps outlined above for making an acylated benzene sulfonate can vary and that the foregoing exemplary embodiments are provided to aid in the understanding of the disclosure and should not be interpreted as limiting the scope thereof. The skilled artisan also can readily determine specific conditions associated with the production of an acylated benzene sulfonate, such as amounts and types of reagents, temperatures, reaction times, and the like, without undue experimentation.

The dual-function additive may be utilized in various cleaning compositions. Examples of cleaning compositions include but are not limited to compositions for dishwashing (also dishwashing detergents), laundry (also laundry detergents), cleaners for various surfaces including, but not limited to, tile, ceramic, glass, wood, plastic, and/or metal, and the like.

The dual-function additive is added to the cleaning composition in an amount effective to achieve the desired cleaning objective (e.g., to reduce and/or substantially remove spotting and/or filming of glassware and/or to reduce and/or substantially remove food, beverage, grass, dirt, etc. stains and/or soils from tableware, cookware, bakeware, laundry (e.g., clothing, bedding, towels, and/or other fabric/textile articles), and/or surfaces such as found in a home, industrial and/or commercial environments (e.g., tile, ceramic, glass, wood, plastic, and/or metal surfaces), etc.). The skilled artisan will understand that the amount of the dual-function additive in the cleaning composition can vary depending, for example, on the environment in which the cleaning composition is used, the product to be cleaned, e.g., to hand and/or machine wash tableware (e.g., glassware, dishware, and/or cutlery/silverware), cookware, bakeware, etc., such as in an automatic dishwasher, to machine and/or hand launder textiles/fabrics (clothing, bedding, towels, etc.), to clean surfaces, and the like.

In exemplary cleaning compositions, the acylated benzene sulfonate additive can be added in an amount of 0.1% by weight to 50% by weight, for example 0.1% by weight to 10% by weight, and as another example 1% by weight to 5% by weight, based on the total weight of the cleaning composition. In some embodiments, the acylated benzene sulfonate additive can be added to a cleaning composition (e.g., dishwashing detergent such as ADW detergent, laundry detergent, surface cleaner, etc.) in an amount of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight based on the total weight (100% by weight) of the cleaning composition. Further, according to some embodiments, the acylated benzene sulfonate additive can be present in an amount of from any of the foregoing amounts to any other of the foregoing amounts.

As a non-limiting example, the dual-function additive can be added to a dishwashing detergent in an amount effective to reduce filming and/or spotting of glassware (e.g., as measured in accordance with ASTM D3556-14) and/or to reduce (e.g., remove) beverage and/or food staining and/or soiling of dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil, etc. on stained/soiled dishware in accordance with IKW Methods for Ascertaining the Cleaning Performance of Dishwasher Detergents (Part B, updated 2005)). In exemplary dishwashing detergents (e.g., ADW detergent), the acylated benzene sulfonate additive can be added in an amount of 0.1% by weight to 50% by weight, for example 0.1% by weight to 10% by weight, and as another example 1% by weight to 5% by weight, based on the total weight (100% by weight) of the dishwashing detergent. In some embodiments, the acylated benzene sulfonate additive can be added to the dishwashing detergent (e.g., ADW detergent) in an amount of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight based on the total weight (100% by weight) of the dishwashing detergent. Further, according to some embodiments, the acylated benzene sulfonate additive can be present in an amount of from any of the foregoing amounts to any other of the foregoing amounts.

The cleaning compositions of the present disclosure can include one or more other ingredients, such as conventional ingredients known in the art for dishwashing detergents, laundry detergents, surface cleaners, and the like.

For example, the cleaning composition can include a chelating agent in addition to (different from) the acylated benzene sulfonate additive of the present disclosure. Examples of chelating agents that can be used in the cleaning compositions of the present disclosure (e.g., ADW detergents) include without limitation amino acid based chelating agents, e.g., methyl-glycine-diacetic acid (MGDA), glutamic-N,N-diacetic acid (GLDA), and the like; aminopolycarboxylic acid based chelating agents, such as ethylenediaminetetraacetic acid (EDTA), diethylenetriaminepentaacetic acid (DTPA), and the like; phosphonic acid based chelating agents such as 1-hydroxyethylidene-1,1-diphosphonic acid (HEDP) and the like; polycarboxylic acids and salts thereof such as citric acid, sodium citrate, and the like; catechol disulfonate (Tiron); and the like; as well as salts and derivatives thereof, and mixtures thereof.

When a chelating agent is present, the cleaning composition can include the chelating agent in an amount of 1% by weight to 50% by weight, for example 5% by weight to 30% by weight, and as another example 10% by weight to 25% by weight, based on the total weight (100% by weight) of the cleaning composition. In some embodiments, the chelating agent can be added to the cleaning composition in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight based on the total weight (100% by weight) of the cleaning composition. Further, according to some embodiments, the chelating agent can be present in an amount of from any of the foregoing amounts to any other of the foregoing amounts.

As discussed in more detail herein, in exemplary embodiments, the cleaning composition (e.g., ADW detergent) including the acylated benzene sulfonate additive of the present disclosure can be formulated to include a chelating agent in reduced amounts, as compared to conventional cleaning compositions without the acylated benzene sulfonate additive (and, in some embodiments, can be formulated without a separate conventional bleach activator that is different from the acylated benzene sulfonate of the present disclosure, such as TAED and/or NOBS as discussed herein). Despite the reduced amounts of chelating agent (and/or despite the absence of a conventional bleach activator), surprisingly it has been found in some embodiments that the resultant cleaning composition (e.g., ADW detergent) can exhibit similar or improved cleaning properties, such as similar or reduced spotting and/or film formation on glassware (e.g., as measured in accordance with ASTM D3556-14) and/or similar or improved removal of food and/or beverage stains and/or soils on dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware as measured in accordance with IKW Methods for Ascertaining the Cleaning Performance of Dishwasher Detergents (Part B, updated 2005)), as compared to the same cleaning composition but including a conventional bleach activator instead of the acylated benzene sulfonate of the present disclosure, as discussed in more detail herein. In some embodiments, despite reduced amounts of chelating agent and/or despite the absence of a conventional bleach activator, the dishwashing detergent (e.g., ADW detergent) can provide similar (e.g., in relatively higher water hardness environments including for example about 300 ppm $Ca^{+2}$ ions) and/or improved (e.g., in relatively lower water hardness environments including for example about 110 ppm Ca-2 ions) reduction of spotting and/or film formation on glassware (e.g., as measured in accordance with ASTM D3556-14) and/or removal of food and/or beverage stains and/or soils on dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware as measured in accordance with IKW Methods for Ascertaining the Cleaning Performance of Dishwasher Detergents (Part B, updated 2005)), as compared to the same cleaning composition but including a conventional bleach activator instead of the acylated benzene sulfonate of the present disclosure, as discussed in more detail herein.

For example, some embodiments of the present disclosure include dishwashing detergents (e.g., ADW detergents) including greater than zero to no greater than 5% by weight, for example greater than zero to no greater than 2% by weight, of the acylated benzene sulfonate, and greater than zero to no greater than 20% by weight, for example greater than zero to no greater than 15% by weight, of a chelating agent such as MGDA (and, in some embodiments, without a separate conventional bleach activator that is different from the acylated benzene sulfonate of the present disclosure, such as TAED and/or NOBS as discussed herein). Despite the reduced amounts of chelating agent and/or despite the absence of a conventional bleach activator, in some embodiments, surprisingly it has been found that glassware washed using the dishwashing detergent (e.g., ADW detergent) can have a spot and/or film rating (e.g., both a spot and film rating) of 3.0 or less as measured in accordance with ASTM D3556-14, for example, a spot and film rating of 2.5 or less, and as another example a spot and film rating of 2.3 or less, each as measured in accordance with ASTM D3556-14. In addition or as an alternative, despite the reduced amounts of chelating agent and/or despite the absence of a conventional bleach activator, in some embodiments, surprisingly it has also been found that the dishwashing detergent (e.g., ADW detergent) can provide similar and/or improved removal of food and/or beverage stains and/or soils (e.g., as determined by measuring removal of colored, bleachable soil such as tea stains, persistent burnt soil such as burnt milk soil, dried, starchy soil such as pasta soil, and/or dried protein soil such as egg yolk soil in accordance with IKW Methods for Ascertaining the Cleaning Performance of Dishwasher Detergents (Part B, updated 2005)) from dishware, cookware, bakeware, etc., as compared to the same composition but including a conventional bleach activator instead of the acylated benzene sulfonate additive of the present disclosure.

As another example, the cleaning composition can include a bleach activator in addition to (different from) the acylated benzene sulfonate additive of the present disclosure. Bleach activators include organic peracid precursors that react with hydrogen peroxide (perhydrolysis) to release peracids to enhance bleaching action at temperatures of 60° C. and below. Bleach activators that can be used in the cleaning compositions of the present disclosure (e.g., ADW detergents) include without limitation compounds which, under perhydrolysis conditions, give aliphatic peroxoycarboxylic acids having 1 to 10 carbon atoms, for example 2 to 4 carbon atoms, and/or optionally substituted perbenzoic acid. Suitable substances have O-acyl and/or N-acyl groups of the number of carbon atoms specified and/or optionally substituted benzoyl groups.

Examples of bleach activators include without limitation polyacylated alkylenediamines such as tetraacetylethylenediamine (TAED), acylated triazine derivatives such as 1,5-diacetyl-2,4-dioxohexahydro-1,3,5-triazine (DADHT), acylated glycolurils such as tetraacetylglycoluril (TAGU), N-acylimides such as N-nonanoylsuccinimide (NOSI), acylated phenolsulfonates such as n-nonanoyl- and/or isononanoyloxybenzenesulfonate (n- and/or iso-NOBS), carboxylic anhydrides such as phthalic anhydride, acylated polyhydric alcohols such as triacetin, ethylene glycol diacetate, 2,5-diacetoxy-2,5-dihydrofuran and triethylacetyl citrate (TEAC), and the like and mixtures thereof.

When a bleach activator is present, the cleaning composition can include the bleach activator in an amount of 0.001% by weight to 10% by weight, for example 0.01% by weight to 5% by weight, based on the total weight (100% by weight) of the cleaning composition. In some embodiments, the bleach activator can be added to the cleaning composition in an amount of 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight based on the total weight (100% by weight) of the cleaning composition. Further, according to some embodiments, the bleach activator can be present in an amount of from any of the foregoing amounts to any other of the foregoing amounts.

As another example, the cleaning composition can include a peroxide source. Peroxide sources are known in the art and can include hydrogen peroxide and/or inorganic peroxide compounds (e.g., persalts) that release hydrogen peroxide when dissolved in water. The hydrogen peroxide (including hydrogen peroxide released by inorganic peroxide compounds in water) can react with a bleach activator to generate a peracid. For example, as discussed herein, when combined with a peroxide source and water, the acylated benzene sulfonate additive of the present disclosure can generate sulfonated benzene derivatives and peracid.

Examples of peroxide sources that can be used in the cleaning compositions of the present disclosure (e.g., ADW detergents) include without limitation hydrogen peroxide and/or persalts (e.g., percarbonates, perborates, persilicates, and/or persulfates). In exemplary embodiments, the peroxide source can be a sodium persalt, such as sodium percarbonate, sodium perborate, and/or sodium persulfate, for example, can be sodium percarbonate.

When present, the cleaning composition can include a peroxide source in an amount of 0.5% by weight to 15% by weight, for example 1% by weight to 10% by weight, based on the total weight (100% by weight) of the cleaning composition. In some embodiments, the peroxide source can be added to the cleaning composition in an amount of 0.5, 0.6, 0.7, 0.8, 0.9, 1, 2, 3, 4, 5, 6, 7, 8, 9, 10, 11, 12, 13, 14, or 15% by weight based on the total weight (100% by weight) of the cleaning composition. Further, according to some embodiments, the peroxide source can be present in an amount of from any of the foregoing amounts to any other of the foregoing amounts.

The peroxide source may be added directly to the cleaning composition (e.g., ADW detergent) or it may be provided in a form separate from the acylated benzene sulfonate additive. As a non-limiting example, the cleaning composition (e.g., ADW detergent) can be formulated as a product with two or more different compartments, wherein the acylated benzene sulfonate additive is present in one compartment and the peroxide source is present a separate compartment. In this manner, the acylated benzene sulfonate additive and peroxide source can be separated to prevent premature formation of peroxide, acylated benzene sulfonate derivative and peracid. Products including two of more different compartments are well known in the art.

In exemplary embodiments, the cleaning composition (e.g., ADW detergent, laundry detergent, surface cleaner, etc.) can include one or more of an acylated benzene sulfonate additive of Formula I and/or one or more of a peroxide source and/or one or more of a conventional chelating agent (e.g., MGDA, etc.) and/or one or more of a conventional bleach activator (e.g., TAED, NOBS, etc.).

As a non-limiting example, in some embodiments, the cleaning composition can include an acylated benzene sulfonate additive of the present disclosure, a conventional chelating agent such as MGDA, a conventional bleach activator such as TAED and/or NOBS, and a peroxide source.

As another non-limiting example, in some embodiments, the cleaning composition can include an acylated benzene sulfonate additive of the present disclosure and a peroxide source, without a conventional chelating agent such as MGDA and/or without a conventional bleach activator such as TAED and/or NOBS (e.g., without a conventional chelating agent such as MGDA; without a conventional bleach activator such as TAED and/or NOBS; or without a conventional chelating agent such as MGDA and without a conventional bleach activator such as TAED and/or NOBS).

For example, as discussed herein, in some embodiments, the cleaning composition (e.g., ADW detergent) can include an acylated benzene sulfonate additive of the present disclosure, a conventional chelating agent such as MGDA, and a peroxide source, without also including a separate conventional bleach activator. In some embodiments, it was surprisingly found that the cleaning composition can exhibit similar or improved performance with respect to spot and/or film reduction on glassware (e.g., as measured in accordance with ASTM D3556-14) and/or with respect to food and/or beverage stain and/or soil removal of dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware in accordance with IKW Methods for Ascertaining the Cleaning Performance of Dishwasher Detergents (Part B, updated 2005)), as compared to the same cleaning composition but including a conventional bleach activator such as TAED instead of the acylated benzene sulfonate additive of the present disclosure (e.g., without the acylated benzene sulfonate additive of the present disclosure). In some embodiments, it was also surprisingly found that the amount of the conventional chelating agent such as MGDA could be reduced, for example, by up to 35%, as compared to the same cleaning composition formulation with the same chelating agent but including a conventional bleach activator such as TAED instead of the acylated benzene sulfonate compound of the present disclosure (e.g., without the acylated benzene sulfonate additive of the present disclosure), and still achieve similar or improved spot and/or film reduction on glassware (e.g., as measured in accordance with ASTM D3556-14) and/or achieve similar or improved food and/or beverage stain and/or soil removal from dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware in accordance with IKW Methods for Ascertaining the Cleaning Performance of Dishwasher Detergents (Part B, updated 2005)).

In other exemplary embodiments, the cleaning composition (e.g., ADW detergent) can include an acylated benzene sulfonate additive of the present disclosure, a conventional bleach activator such as TAED and/or NOBS, and a peroxide source, without a conventional chelating agent such as MGDA.

The cleaning compositions can also include one or more of other conventional cleaning composition components in amounts known in the art. Examples of the additional components can include without limitation surfactants (e.g., nonionic, anionic, cationic, amphoteric, and/or zwitterionic surfactants), alkalinity sources (e.g., alkali hydroxides such as sodium hydroxide and/or potassium hydroxide, alkali hydrides, alkali oxides, alkali sesquicarbonates, alkali carbonates such as sodium carbonate, alkali borates, alkali salts of mineral acids, alkali amines, alkaloids and the like and mixtures thereof), enzymes (e.g., proteases and/or amylases), polymers, anti-corrosion agents (e.g. sodium silicate), and the like, and mixtures thereof.

The cleaning compositions can be provided in conventional forms. Examples include without limitation powders, gels, liquids, pastes, granules, tablets, capsules, pouches, sachets, multi-compartment (including dual compartment) containers, sprays, foams, premoistened wipes (the cleaning composition in combination with a nonwoven material), dry wipes (the cleaning composition in combination with a nonwoven material wherein the composition is activated with water by a consumer), and other homogenous and/or multiphase cleaning product forms. In some embodiments, the cleaning composition can be provided as a unit-dose (e.g., single dose) product (e.g., tablets, capsules, sachets, pouches, etc.) such as known in the art. In some embodiments, the unit-dose product may be contained in a water soluble film. In some embodiments, the unit-does product may be in the form of a water-soluble pouch (e.g., a water soluble pouch including a single compartment, a water soluble pouch including two or more compartments to form a multicomponent pouch, etc.).

In some embodiments, the cleaning composition can be in liquid form and can include a liquid carrier known in the art (e.g., water). The liquid carrier can make up the balance of the composition. For example, the cleaning composition can include liquid carrier in an amount from 20 wt % by weight to 85% by weight, or higher. The amount of liquid carrier can be readily determined by the skilled artisan. In some embodiments, the cleaning composition can include a liquid carrier in an amount of 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight, or higher, based on the total weight (100% by weight) of the cleaning composition. Further, according to some embodiments, the liquid carrier can be present in an amount of from any of the foregoing amounts to any other of the foregoing amounts. It is noted that water may be a carrier for formulations that are mixed immediately prior to use.

Methods for formulating and producing cleaning compositions, such as but not limited to dishwashing detergents, laundry detergents, and other cleaning products, in the various forms noted herein are well known in the art and the specific parameters and conditions thereof (for example the types and amounts of various components, how to provide a particular form thereof, etc.) can be readily determined by the skilled artisan.

The present disclosure also relates to methods of cleaning articles, such as but not limited to tableware (e.g., glassware, dishware, and/or silverware), cookware, bakeware, laundry (e.g., clothing, bedding, towels, and/or other fabric/textile articles), surfaces such as found in a home, industrial and/or commercial environment (e.g., tile, ceramic, glass, wood, plastic, and/or metal surfaces), and the like, utilizing the cleaning composition. In some embodiments, the method of cleaning an article can include one or more of washing (e.g., in an automatic dishwasher, laundry machine, etc.), spraying, scrubbing, mopping, wiping, etc. the article with the cleaning composition of the present disclosure. In some embodiments, the method of cleaning an article can include mechanically agitating the article (e.g., in a laundry machine).

In exemplary embodiments, the method of cleaning an article includes the step of contacting the article (e.g., tableware such as glassware, dishware and/or silverware, laundry, surfaces such as tile, ceramic, glass, wood, plastic, and/or metal surfaces, etc.) with a cleaning composition including the acylated benzene sulfonate additive of the present disclosure as described herein. As a non-limiting example, the step of contacting the article can include supplying the cleaning composition to an automatic dishwasher including glassware, dishware and/or silverware; and operating the automatic dishwasher (e.g., wherein operating the automatic dishwasher can include supplying water in the automatic dishwasher under conditions selected to clean, wash, etc. the glassware, dishware and/or silverware with the dishwashing detergent). As another non-limiting example, the step of contacting the article can include supplying the cleaning composition to a laundry machine including articles to be laundered; and operating the laundry machine (e.g., wherein operating the laundry machine can include supplying water in the laundry machine under conditions selected to clean, wash, etc. the articles to be laundered with the dishwashing detergent). As another non-limiting example, the step of contacting the article can include applying the cleaning composition to a surface such as tile, ceramic, glass, wood, plastic, glass, and/or metal surfaces in a manner (e.g., mopping, wiping, etc.) to clean the surface. The method can also include the step of rinsing the article (e.g., to remove cleaning composition from the article after completion of the cleaning step). The method can also include the step of introducing water before, during and/or after the step of contacting the article with the cleaning composition.

In some embodiments, the cleaning composition (e.g., ADW detergent) used in the method of cleaning may include greater than zero to no greater than 5% by weight, for example greater than zero to no greater than 2% by weight, of the acylated benzene sulfonate, and greater than zero to no greater than 20% by weight, for example greater than zero to no greater than 15% by weight, of a chelating agent such as MGDA (and, in some embodiments, without a separate conventional bleach activator that is different from the acylated benzene sulfonate of the present disclosure). In some embodiments, it was surprisingly found that the method of cleaning using such a cleaning composition can provide similar or improved performance with respect to spot and/or film reduction on glassware (e.g., as measured in accordance with ASTM D3556-14) and/or with respect to food and/or beverage stain and/or soil removal of dishware, cookware, bakeware, etc. (e.g., as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware in accordance with IKW Methods for Ascertaining the Cleaning Performance of Dishwasher Detergents (Part B, updated 2005)), as compared to a method of cleaning using the same cleaning composition but including a conventional bleach activator such as TAED instead of the acylated benzene sulfonate additive of the present disclosure (e.g., without the acylated benzene sulfonate additive of the present disclosure).

The present disclosure further relates to methods of reducing spotting and/or filming on a substrate surface (e.g., glassware) such as measured in accordance with ASTM D3556-14 and/or removing stains and/or soils (e.g., food and/or beverage stains and/or soils) from a substrate surface (e.g., dishware) such as determined by measuring the removal of colored, bleachable soil such as tea stains, persistent burnt soil such as burnt milk soil, dried, starchy soil such as pasta soil, and/or dried protein soil such as egg yolk soil from stained and/or soiled dishware in accordance with IKW Methods for Ascertaining the Cleaning Performance of Dishwasher Detergents (Part B, updated 2005). In exemplary embodiments, the method includes contacting the substrate surface with a dishwashing detergent including the acylated benzene sulfonate additive of the present disclosure as described herein. For example, the contacting step can include supplying the dishwashing detergent to an automatic dishwashing machine including glassware, dishware and/or silverware; and operating the automatic dishwashing machine (e.g., to wash, clean, etc. the glassware, dishware and/or silverware with the dishwashing detergent). The method can also include the step of introducing water before, during and/or after the contacting step. The substrate can be, for example, glassware, wherein the method reduces spotting and/or filming on the glassware surface (e.g., as measured in accordance with ASTM D3556-14); and/or dishware, cookware, bakeware, etc., wherein the method reduces and/or removes food and/or beverage stains and/or soils (e.g., as determined by measuring the removal of colored, bleachable soil such as tea stains, persistent burnt soil such as burnt milk soil, dried, starchy soil such as pasta soil, and/or dried protein soil such as egg yolk soil in accordance with IKW Methods for Ascertaining the Cleaning Performance of Dishwasher Detergents (Part B, updated 2005)) from the dishware, cookware, bakeware, etc. surface. In some embodiments, the dishwashing detergent used in the method can further include a chelating agent, such as MGDA; and/or a bleach activator, such as TAED and/or NOBS; and/or a peroxide source, such as persalt as described herein. In some embodiments, the dishwashing detergent used in the method can further include a chelating agent, such as MGDA and/or a peroxide source, such as persalt as described herein, without also including a separate conventional bleach activator, such as TAED and/or NOBS. In some embodiments, the dishwashing detergent used in the method of reducing spotting and/or filming on a substrate surface (e.g., glassware) and/or removing food and/or beverage stains and/or soils on a substrate surface (e.g., dishware, cookware, bakeware, etc.) may include greater than zero to no greater than 5% by weight, for example greater than zero to no greater than 2% by weight, of the acylated benzene sulfonate, and greater than zero to no greater than 20% by weight, for example greater than zero to no greater than 15% by weight, of a chelating agent such as MGDA (and, in some embodiments, without a separate conventional bleach activator that is different from the acylated benzene sulfonate of the present disclosure).

EXAMPLES

Next, the present disclosure will be described in more detail with reference to the following examples. It should be understood that these examples are provided for illustration only and are not to be construed in any way as limiting the present invention.

Synthesis of Acylated Benzene Sulfonates

Example 1: Preparation of Acetyl (Disulfophenol), Dipotassium Salt (AcDKSP)

A method for the production of acetyl (disulfophenol), dipotassium salt (AcDKSP) represented by the formula below is described herein:

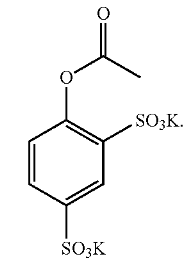

Molten phenol (188 grams) is added to a 2 liter flask and heated to a temperature from 50° C. to 60° C. Oleum (30%, 550 grams) is slowly added at a temperature from 50° C. and 100° C., and the mixture is held for 3 hours at 100° C. to provide a mixture including a sulfonated phenol. The mixture including the sulfonated phenol is then cooled to 70° C. to 80° C.

In a separate 2 liter flask, water (300 grams) and 45% KOH (504.4 grams) are added. The mixture including the sulfonated phenol is added to the water/caustic solution at a temperature of 20° C. to 110° C. The mixture is cooled to 5° C., and then filtered to provide a cake containing (disulfophenol), dipotassium salt (DKSP). The cake containing DKSP is washed 2 times with 300 grams of methanol and then dried in a 90° C. vacuum oven to give 568 grams of DKSP as a white solid.

Acetic acid (100 grams) and acetic anhydride (250 grams) are added to a clean 1 liter flask. DKSP (188.7 grams from above) and sulfuric acid (5.2 grams) are added to the flask, and the mixture is heated to 80° C. and held 3 hours. Potassium acetate (8.2 grams) is added to neutralize the catalyst (sulfuric acid). After 15 minutes at 80° C., the mixture which includes acetylated dipotassiosulfophenol (AcDKSP) is cooled to 50° C.

In a separate 1 liter flask, acetone (300 grams) is added. The mixture including AcDKSP is slowly added to the acetone in the flask to form a slurry including AcDKSP. The slurry is heated to 80° C. and held 2 hours. The slurry is then cooled to 20° C. to 25° C. and filtered to provide a cake containing AcDKSP. The cake containing the AcDKSP is reslurried two times in 200 grams of acetone. The final cake containing AcDKSP is dried in a 50° C. oven to give a 90% yield of AcDKSP as a white solid.

The foregoing method is also illustrated schematically below:

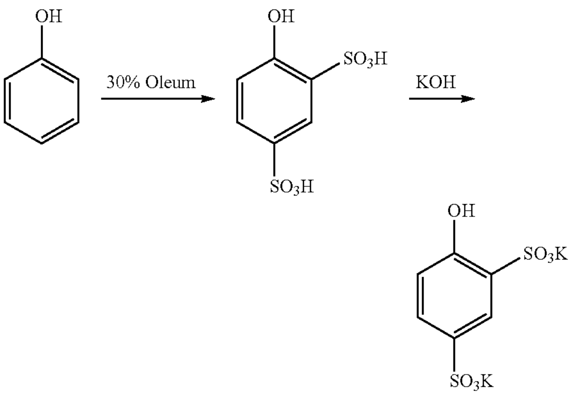

Dipotassiosulfophenol (DKSP)

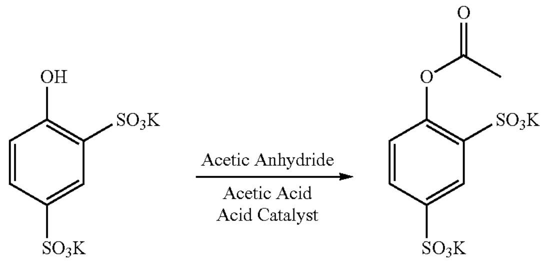

Dipotassiosulfophenol (DKSP)

Acetylated Dipotassiosulfophenol (AcDKSP)

Example 2: Preparation of Acetyl (Disulfophenol), Disodium Salt (AcDSSP)

A method for the production of acetyl (disulfophenol), disodium salt (AcDSSP) represented by the formula below is described herein:

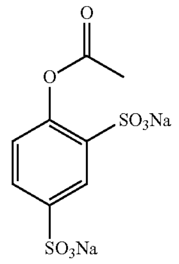

Molten phenol (188 grams) is added to a 2 liter flask and heated to a temperature from 50° C. to 60° C. Oleum (30%, 550 grams) is slowly added at a temperature from 50° C. and 100° C., and the mixture is held 3 hours at 100° C. to provide a mixture including a sulfonated phenol. The mixture including the sulfonated phenol is then cooled to 70° C. to 80° C.

In a separate 2 liter flask, water (291 grams) and 50% NaOH (352 grams) are added. The mixture including the sulfonated phenol is added to the water/caustic solution at a temperature of 20° C. to 110° C. The mixture is cooled to 5° C., and then filtered to provide a cake containing (disulfophenol), disodium salt (DSSP). The cake containing DSSP is washed 2 times with 300 grams of methanol and then dried in a 90° C. vacuum oven to give 470 grams of DSSP as a white solid.

Acetic acid (150 grams) and acetic anhydride (187.5 grams) are added to a clean 1 liter flask. DSSP (243 grams from above) and sulfuric acid (2 grams) are added to the flask, and the mixture is heated to 95° C. and held 3 hours. Sodium acetate (4 grams) is added to neutralize the catalyst (sulfuric acid). After 15 minutes at 80° C., the mixture which includes acetylated disodiosulfophenol (AcDSSP) is cooled to 25° C.

The slurry is filtered to provide a cake containing AcDSSP. The cake containing the AcDSSP is reslurried and refiltered two times in 202 grams of acetic acid. The final cake is dried in a 90° C. oven to give 274 grams of AcDSSP as a white solid.

The foregoing method is also illustrated schematically below:

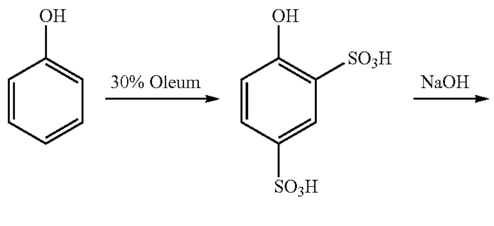

-continued

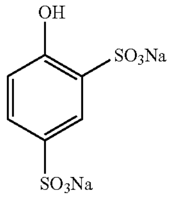

Disodiosulfophenol (DSSP)

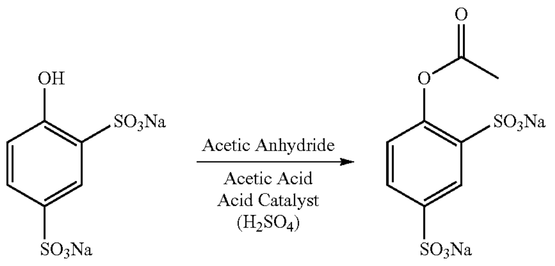

Disodiosulfophenol (DSSP)

Acetylated Disodiosulfophenol (AcDSSP)

Example 3: Preparation of Diacetyl Potassium Hydroquinone Sulfonate (AcKHQS)

A method for the production of a diacyl sulfonated benzene salt of the present disclosure, such as diacetyl potassium hydroquinone sulfonate (AcKHQS) represented by the formula below, is described herein:

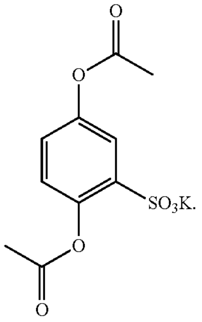

Sulfuric acid (93%; 457.6 g) is added to a 2 liter flask and heated to a temperature from 60° C. to 75° C. Hydroquinone (170 g) is slowly added at a temperature from 60° C. and 75° C., and the mixture is held 2 hours to provide a mixture including a sulfonated hydroquinone. The mixture including the sulfonated hydroquinone is then cooled to 40° C. Water (314 grams) is slowly added at 40° C. to 50° C. Aqueous potassium hydroxide (45%; 192 g) is slowly added at 40° C. to 50° C. The mixture is heated to 65° C. to 75° C. and held 30 minutes. The mixture is cooled to 10° C., and then filtered to provide a cake containing potassium hydroquinone sulfonate (KHQS). The cake is washed 4 times with 100 grams of methanol and then dried in a 70° C. vacuum oven to give 246.6 g (70% yield) of KHQS as a white solid.

Acetic acid (150 grams) and acetic anhydride (400 grams) are added to a clean 1 liter flask. KHQS (246.6 grams from above) and sulfuric acid (2 grams) are added to the flask, and the mixture is heated to 95° C. and held 3 hours. Sodium acetate (4 grams) is added to neutralize the catalyst (sulfuric acid). After 15 minutes at 80° C., the mixture which includes diacetylated KHQS is cooled to 25° C.

The slurry is filtered to provide a cake containing AcKHQS. The cake containing the AcKHQS is reslurried and refiltered two times in 202 grams of acetic acid. The final cake is dried in a 90° C. oven to give 330 grams of AcKHQS as a white solid.

The foregoing method is also illustrated schematically below.

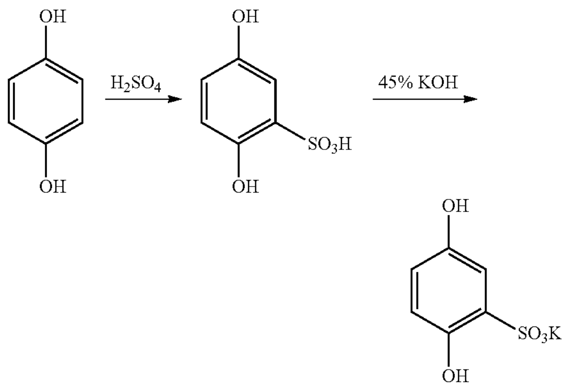

Potassium Hydroquinone Sulfonate
KHQS

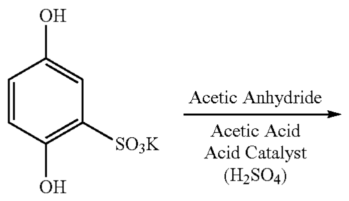

Potassium Hydroquinone Sulfonate
KHQS

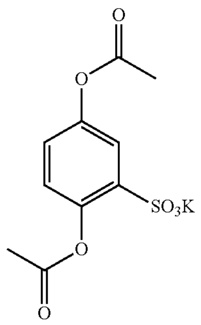

Diacetylated Potassium Hydroquinone Sulfonate
AcKHQS

The foregoing examples provides exemplary details for the production of dual function acylated benzene sulfonates of the present disclosure (e.g., compounds of Formula I). The steps described herein generally relate to a bench procedure and therefore are exemplary of scaled production processes. The skilled artisan will understand how to adapt the examples to standard commercial operating systems and processes. The skilled artisan will also understand how to adapt the examples to the production of other compounds within the scope of the present disclosure (e.g., using other starting compounds, reactants such as other dihydroxybenzenes, sulfonating agents, cation producing compounds, carboxylic acids and/or carboxylic acid derivatives, etc.). Further it is noted that the present disclosure is not limited to specific conditions (temperature, time, pressure, etc.), solvents, amounts, etc. of the examples. Moreover, the present disclosure is not limited to the use of any specifically identified equipment and any equipment known to those of skill in the art that can function in any given step of the examples is also contemplated. The skilled artisan will understand various additional and/or alternative exemplary methods for the production of compounds of the present disclosure (e.g., compounds of Formula I), including alternative solvents, reagents, and/or conditions, that may be used without undue experimentation, for example based on the present disclosure. The skilled artisan will understand, for example, suitable modifications of the foregoing procedures to produce AcDKSP, AcDSSP, and AcKHQS and how to make other compounds of the present disclosure, for example, other acylated sulphonate benzene salts such as compounds including one, two or three sulfonate groups and/or other alkali metal, alkaline earth metal and/or quaternary ammonium anions and/or one or two acyl groups, different acyl groups, etc. (e.g., the sodium salt diacetylated sodium hydroquinone sulfonate (AcSHQS), disulfonated versions of diacylated hydroquinone salts such as diacetylated disodiosulfohydroquinone and/or diacetylated dipotassiosulfohydroquinone, etc. also as described herein).

Analysis of the Dual Functionality of Acylated Benzene Sulfonates

The following examples describe the present disclosure with specified ADW detergent formulations included for comparative purposes. Methylglycine diacetic acid trisodium salt (MGDA), a common chelating agent, along with tetraacetylethylenediamine (TAED) and nonanoyloxybenzene sulfonate (NOBS), two common bleach activators, were used to illustrate the dual functionality component of the present disclosure. Numerous modifications and variations are possible and will be apparent to those skilled in the art. For the studies presented below, acetylated disodiosulfophenol (AcDSSP) and acetylated dipotassiosulfophenol (AcDKSP) were included as an example of the additive of the present disclosure.

Chelating Analysis

The ability to chelate calcium, a hard-water ion, is important in ADW detergents for controlling filming and spotting. The ability of a chelating agent to sequester calcium can be demonstrated by a reduction in the ion once the chelator is added and increased in an aqueous solution containing hard water ions.

The ability to function as a chelator was evaluated using a Cole Parmer water hardness ion selective electrode to quantitatively measure levels of calcium in aqueous solutions. Prior to measurement, the electrode was filled with the provided reference solution and shaken to remove air bubbles. The electrode was immersed in a 100 ppm $CaCO_3$ solution for 30 min. prior to usage and for short term storage. Seven solutions ranging from 1 to 134 ppm $CaCO_3$ were prepared using calcium chloride ($CaCl_2$). $2H_2O$) for calibration. To adjust the background ionic strength, potassium chloride (4M) was added to each calibration and sample solution. The pH was also adjusted to 9.5 to 10 for the same solutions to replicate expected levels seen in ADW detergents. Solutions were placed on a magnetic stirrer and stirred at a constant rate. The electrode was immersed in each solution with the millivolts recorded after the reading stabilized.

Beginning with separate solutions containing 100 ppm $CaCO_3$, molar equivalents of chelator to $CaCO_3$ were added in a range from 0.5 to 4 equivalents. The amount of calcium, expressed as $CaCO_3$, was measured for each solution and is presented in the Figure. Because an acylated benzene sulfonate of the present disclosure undergoes perhydrolysis when combined with a source of peroxide in the dishwashing wash liquor, the hydrolyzed derivatives of disodiosulfophenol (DSSP) and dipotassiosulfophenol (DKSP) were used to demonstrate chelation rather than AcDSSP or AcDKSP. Based on the same mechanisms for TAED and NOBS, diacetylethylenediamine (DAED) and para-sodiosulfophenol (SSP) were evaluated. MGDA was included as a control given its chelation strength and presence in ADW detergents. Because it does not undergo perhydrolysis, no substitutions for the hydrolyzed product had to be made for this study.

Results for chelation of hard water with the three different chelating agents are given in the graph of the Figure. The left vertical axis of the graph of the Figure includes the scale for water hardness in ppm expressed as $CaCO_3$. The horizontal axis of the graph of the Figure includes the scale of the molar equivalent of chelate added. For MGDA, the level of water hardness was reduced by half after addition of 0.5 molar equivalents and further reduced by 95% after one equivalent was added to the solution. Further addition of MGDA resulted in complete chelation. While DSSP and DKSP did not have the same steep levels of decline as MGDA, steady decreases in water hardness were observed with 70% and 66% reductions, respectively, after four molar equivalents. DAED and SSP had small initial decreases in water hardness with only a 32% and 22% reduction, respectively, after the same molar equivalent addition.

DSSP and DKSP reduced water hardness levels more significantly compared to DAED or SSP. Addition of AcDSSP or AcDKSP, in combination with a peroxide source for perhydrolysis, could aid another chelating agent to sequester hard water ions. A combination of AcDSSP or AcDKSP and MGDA would thus be more effective for chelation than using either TAED or NOBS with MGDA.

Bleach activators enhance the bleaching action of difficult to remove stains, such as tea stains, in ADW detergents. Bleach activators of the present disclosure, under perhydrolysis conditions, include peroxocarboxylic acids having from 1 to 11 carbons.

ADW Formulations for Filming/Spotting and Bleach Activation Analysis

The ADW detergent formulations used for testing are included in Table 1. Formulations A-D were used for the filming and spotting tests presented below. The amount of MGDA was varied to compare cleaning performance with the remainder substituted with sodium chloride to give 100%. The remaining formulations (E-G) were used for the stain and soil removal testing included below. In order to replicate a finished product for formulation, the solid powder of the present invention was granulated using a binder.

TABLE 1

ADW Detergent Formulations (amounts in wt %)

| | A | B | C | D | E | F | G |
|---|---|---|---|---|---|---|---|
| Sodium chloride | 58.5 | varied | varied | varied | 43.5 | 43.5 | 35.5 |
| Sodium sulfate | 15 | 15 | 15 | 15 | 15 | 15 | 15 |
| Sodium carbonate | 15 | 15 | 15 | 15 | 15 | 15 | 15 |
| TAED | 2 | 2 | — | — | 2 | — | 2 |
| AcDSSP | — | — | 2 | — | — | 2 | — |
| AcDKSP | — | — | — | 2 | — | — | — |
| Sodium percarbonate | 5 | 5 | 5 | 5 | 5 | 5 | 5 |
| Plurafac SLF 180[1] | 2 | 2 | 2 | 2 | 2 | 2 | 2 |
| Sodium metasilicate | 1 | 1 | 1 | 1 | 1 | 1 | 1 |
| Protease | 1 | 1 | 1 | 1 | 1 | 1 | 1 |
| Amylase | 0.5 | 0.5 | 0.5 | 0.5 | 0.5 | 0.5 | 0.5 |
| MGDA | — | varied | varied | varied | 15 | 15 | 23 |

[1]alcohol alkoxylate from BASF

Filming and Spotting on Glassware

To determine the ability of an ADW formulation containing an acylated benzene sulfonate of the present disclosure to chelate hard water ions, a dishwashing test to evaluate filming and spotting was performed based on ASTM D3556-14.

Tests were performed using Libbey 10.25 oz. glass tumblers in a dishwasher in the presence of hard water and food soil. Prior to testing, glasses were cleaned to remove any film or debris by hand using a 1% solution of citric acid followed by washing in a dishwasher using deionized water and a commercially available ADW detergent. Once clean, no "water break" observed upon rinsing, the tumblers were dried using the drying cycle of the dishwasher. This same cleaning procedure was repeated in between each test.

The following criteria were followed for loading the dishwasher, soiling dishware, preparing the hard water, and programming the dishwasher for the various testing conditions. For loading the dishwasher, fifteen glass tumblers were distributed evenly in the upper rack. In the lower rack, six soiled dinner plates, three cereal bowls, and six salad plates were distributed. In the silverware rack, six stainless steel knives, forks, and spoons were placed. For soiling of the dinner plates, 6.7 g of food soil (80:20 weight % of margarine and powdered milk) was spread evenly across each plate using a brush. The water for testing was prepared in a 55 gallon stainless steel drum using deionized water at a level of 250 ppm water hardness (2:1 Ca/Mg ratio). A temperature of 54.4±3.8° C. was maintained throughout the duration of the test. For each sample set, five dishwasher cycles were used with reapplication of the food soil and addition of new detergent after each cycle. The one hour wash cycle setting was used for each cycle with the drying option selected at the duration of the 5th cycle. The formulations presented in Table 1 were used for testing with the dishwasher dispenser filled to the top for each cycle.

The levels of filming and spotting were ranked by three independent evaluators (results were averaged) based on a scale of 1 to 5 in accordance with the rating system of ASTM D3556-14. Visual evaluation was made 24 hours after the cycle had ended by shining a flashlight though the opening of the glass tumbler. A rating of 1 indicated no spots or film. A rating of 2 indicated random spots that covered less than a quarter of the glass surface with a barely perceptible film. A rating of 3 indicated spots that covered approximately a quarter of the glass with a slight film. A rating of 4 indicated spots that covered approximately half of the glass surface with a moderate amount of film. A rating of 5 indicated the glass was virtually completely covered with spots and a heavy film was present. In instances of high filming, the ability to grade spotting was reduced.

The tables below include the rating system in accordance with ASTM D3556-14 (a lower number on the rating scales of 1 to 5 indicates a better result, for example, a lower/reduced amount of filming and/or spotting present on the glassware after washing):

Filming:

| Rating | Filming |
|---|---|
| 1 | None |
| 2 | Barely perceptible |
| 3 | Slight |
| 4 | Moderate |
| 5 | Heavy |

Spotting:

| Rating | Spotting |
|---|---|
| 1 | No spots |
| 2 | Spots at Random |
| 3 | About ¼ of Surface Covered |
| 4 | About ½ of Surface Covered |
| 5 | Virtually Completely Covered |

Results of the spotting and filming tests are illustrated below in Table 2. Example 1A, included as the control, included bleach activator TAED but did not contain any chelating agent. Glasses washed with this formulation were heavily coated with spots and film resulting in a high ranking.

Examples 2B-5B contained bleach activator TAED with increasing levels of chelating agent MGDA. As the level of the chelating agent MGDA increased, the ranking improved with glasses containing fewer spots and film. A level of 23% MGDA indicated optimum performance for this study.

By comparison, Examples 2C-5C contained the AcDSSP described by the current disclosure in place of bleach activator TAED using the same increasing levels of chelating agent MGDA. An improved ranking was observed with lower levels of chelating agent MGDA compared to the previous formulation. At 15% MGDA, the levels of spotting and filming were not significantly different at a 95% CL compared to the formulation using 23% MGDA with TAED.

Similarly, examples 2D-5D contained the AcDKSP also described by the current disclosure in place of bleach activator TAED using the same increasing levels of chelating agent MGDA. As with AcDSSP, an improved ranking was observed with lower levels of chelating agent MGDA compared to the previous formulation. At 15% MGDA, the levels of spotting and filming were not significantly different at a 95% CL compared to the formulation using 23% MGDA with TAED.

Detergent formulations containing AcDSSP or AcDKSP, compared to formulations containing bleach activator TAED, allowed less chelating agent MGDA to be added to give the same level of performance. A reduction of 35% MGDA was obtained by using either additives of the present disclosure. Thus, AcDSSP or AcDKSP can be used in place of a conventional bleach activator such as TAED to act as a chelating agent to aid stronger additives, such as MGDA, to prevent the appearance of spotting and filming in ADW detergents.

TABLE 2

| ADW Detergent Formulation (Table 1) | | Spot Rating | Film Rating |
|---|---|---|---|
| Example 1 (control) | A | — | 5.0 |
| Example 2 | B | 3.3 | 2.6 |
| 13% MGDA | C | 3.4 | 2.8 |
| | D | 3.0 | 3.2 |
| Example 3 | B | 2.8 | 2.3 |
| 15% MGDA | C | 2.2 | 2.1 |
| | D | 2.1 | 2.3 |
| Example 4 | B | 2.6 | 3.3 |
| 20% MGDA | C | 2.2 | 1.8 |
| | D | 2.1 | 2.4 |
| Example 5 | B | 2.3 | 2.3 |
| 23% MGDA | C | — | — |
| | D | — | — |

In exemplary embodiments, the ADW detergents according to the present disclosure can include an acylated benzene sulfonate compound of Formula I (e.g., can include an acylated benzene sulfonate compound of Formula I, such as AcDSSP and/or AcDSKP, a chelating agent, and a peroxide source, without also including an additional or separate bleach activator (that is, a bleach activator that is different from (not the same as) the acylated benzene sulfonate compound of Formula I)). In these embodiments, the ADW detergents can exhibit spot and/or film ratings measured in accordance with ASTM D3556-14 comparable to or better than that exhibited by the same compositions, except substituting a bleach activator such as TAED in place of the acylated benzene sulfonate compound of Formula I. Further, in these embodiments, the ADW detergents of the present disclosure can exhibit comparable or improved spot and/or film ratings using reduced amount of the chelating agent (up to 35% by weight reduction), as compared to the same compositions, except substituting a bleach activator such as TAED in place of the acylated benzene sulfonate compound of Formula I. As used herein, "comparable" spot and/or film ratings of a composition including an acylated benzene sulfonate compound of Formula I (e.g., of a composition including an acylated benzene sulfonate compound of Formula I, such as AcDSSP and/or AcDSKP, a chelating agent, and a peroxide source, without also including a bleach activator different from the acylated benzene sulfonate compound of Formula I, such as TAED) can refer to a rating that is about the same (e.g., is the same) and/or to a rating difference (e.g., a lower or reduced rating and/or a higher rating, e.g., a lower or reduced rating) in a range from greater than zero to 50%, for example from greater than 0% to 35%, for example from greater than zero to 25%, for example from greater than zero to 20%, for example from greater than zero to 15%, for example from greater than zero to 10%, and for example from greater than zero to 5%, for example from 1% to 50%, for example from 1% to 35%, for example from 1% to 25%, for example from 1% to 20%, for example from 1% to 15%, as another example from 1% to 10%, and as yet another example from 1% to 5%, as compared to the rating of the same composition except including a bleach activator such as TAED in place of the acylated benzene sulfonate compound of Formula I (e.g., AcDSSP and/or AcDSKP).

Stain and Soil Removal on Dishware

To evaluate the ability of an ADW formulation containing an acylated benzene sulfonate of the present disclosure to act towards stain and soil removal, a dishwashing test to ascertain performance was conducted. The dishwashing test used to evaluate performance with regard to stain and soil removal was based on IKW Methods for Ascertaining the Cleaning Performance of Dishwasher Detergents (Part B, updated 2005).

Tests were performed using a dishwasher set on the normal setting with 3 replicates per formulation. Conditions of 55° C. for the temperature with a water hardness level of 110-114 ppm were used for evaluation against four different soils: black tea (bleachable), burnt milk (persistent), pasta (starch), and egg yolk (dried protein). The following sections summarize the conditions for preparation of the soiled dishware.

Black Tea: Six white porcelain tea cups were stained according to the following procedure: 2 L of synthetic water (3.00 mmol Ca+Mg)+0.1 mL ferric sulfate solution was brought to a boil and poured onto 30 g of Assam black tea. After brewing 5 minutes, the tea was poured through a strainer. Cleaned cups were filled with 100 mL of tea with removal of 20 mL every 5 minutes with a pipette until empty. The process was repeated an additional time with freshly brewed tea. Soiled cups were stored for three days prior to washing. Burnt Milk: Skim milk was burnt onto six glass beakers in a microwave oven set to 450 W for 10 minutes. After heating, the milk soil was further conditioned for 2 hours at 80° C. in a thermal cabinet prior to cleaning. Starch: 3 g of cooked pasta was evenly spread on six glazed white porcelain plates and dried at 80° C. for 2 hours. After washing, the plates were dipped in an iodine solution to highlight residual soil. Egg yolk: Homogenized egg yolk was brushed onto six stainless steel sheets (cleaned, grease-free) at a rate of 1 g/140 $cm^2$ and allowed to air dry at room temperature for a minimum of 4 hours. Sheets were denatured in boiling water for 30 seconds and dried at 80° C. for 30 minutes. After storage for 24 hours at room temperature, the sheets were ready for washing.

Formulations E-G from Table 1 were evaluated, with the dishwasher dispenser filled with 50 g of formulation for each test.

The levels stain and soil removal for tea, milk, and pasta were evaluated using a scale (score) from 1-10 based on varying levels of stain or soil present on the dishware after washing. A higher number on the rating scale of 1 to 10 indicates a better result, for example, a lower/reduced level of stain and/or soil present on the dishware after washing. The ratings are based on a comparison of the dishware with visual descriptors of the rating system in accordance with IKW Methods for Ascertaining the Cleaning Performance of Dishwasher Detergents (Part B, updated 2005). The level of cleaning performance for egg yolk was evaluated gravimetrically according to the following equation: % cleaning performance=((mg egg yolk released)/(mg egg yolk applied (after denaturation))×100. These ratings are in accordance with IKW Methods for Ascertaining the Cleaning Performance of Dishwasher Detergents (Part B, updated 2005).

Results from tests of the four stains and soils (black tea, burned skim milk, cooked pasta and egg yolk) are presented in Table 3. In Table 3, Examples 6, 7, and 8 correspond to formulations E, F, and G, respectively, of Table 1. Example 6 (E) and Example 8 (G) include the types and amounts of components set forth in Table 1, including TAED. Examples 6 (E) and 8 (G) differ with respect to the amounts of sodium chloride and MGDA. Example 7 (F) is the same as Example 6 (E), except Example 7 (F) includes AcDSSP instead of TAED.

Referring to Table 3, Example 7 with AcDSSP performed significantly better for all four stains and soils at 95% confidence level compared to Example 6. Example 7 with AcDSSP performed significantly better at 95% confidence level for black tea, cooked pasta, and egg yolk compared to Example 8 (no significant difference for milk). Thus, the substitution of TAED with AcDSSP of the current invention (Example 7) afforded results with regard to stain and/or soil removal (e.g., black tea, burned skim milk, cooked pasta and/or egg yolk) from dishware that were similar (comparable) to or better than (e.g., significantly improved) the results for the formulations including TAED (Examples 6 and 8).

TABLE 3

| ADW Detergent | Rating | | | % Cleaning |
|---|---|---|---|---|
| Formulation (Table 1) | Black Tea | Burned Skim Milk | Cooked Pasta | Performance Egg Yolk |
| Example 6 (E) | 8.4 | 5.4 | 7.3 | 74.2 |
| Example 7 (F) | 9.6 | 6.6 | 9.6 | 82.8 |
| Example 8 (G) | 8.5 | 6.9 | 8.8 | 58.4 |

As noted herein, in exemplary embodiments, the ADW detergents according to the present disclosure can include an acylated benzene sulfonate compound of Formula I (e.g., can include an acylated benzene sulfonate compound of Formula I, such as AcDSSP and/or AcDSKP, a chelating agent, and a peroxide source, without also including an additional or separate bleach activator (that is, a bleach activator that is different from (not the same as) the acylated benzene sulfonate compound of Formula I, such as TAED)). In these embodiments, the ADW detergents can exhibit stain and/or soil (e.g., black tea, burned skim milk, cooked pasta and/or egg yolk) removal ratings from dishware measured in accordance with IKW Methods for Ascertaining the Cleaning Performance of Dishwasher Detergents (Part B, updated 2005) that is comparable to or better than that exhibited by the same composition, except substituting a bleach activator such as TAED in place of the acylated benzene sulfonate compound of Formula I. As used herein, “comparable” stain and/or soil (e.g., black tea, burned skim milk, cooked pasta, and/or egg yolk) removal ratings of a composition including an acylated benzene sulfonate compound of Formula I (e.g., of a composition including an acylated benzene sulfonate compound of Formula I, such as AcDSSP and/or AcDSKP, a chelating agent, and a peroxide source, without also including a bleach activator different from the acylated benzene sulfonate compound of Formula I, such as TAED) can refer to a rating that is about the same (e.g., is the same) and/or to a rating difference (e.g., a reduced or lower rating and/or a higher rating, e.g., a higher rating) in a range from greater than zero to 50%, for example from greater than 0% to 35%, for example from greater than zero to 25%, for example from greater than zero to 20%, for example from greater than zero to 15%, for example from greater than zero to 10%, and for example from greater than zero to 5%, for example from 1% to 50%, for example from 1% to 35%, for example from 1% to 25%, for example from 1% to 20%, for example from 1% to 15%, as another example from 1% to 10%, and as yet another example from 1% to 5%, as compared to the rating of the same composition except substituting a bleach activator such as TAED in place of the acylated benzene sulfonate compound of Formula I (e.g., AcDSSP and/or AcDSKP).

In some embodiments, dishware washed using the dishwashing detergent according to these embodiments including an acylated benzene sulfonate compound of Formula I (e.g., including an acylated benzene sulfonate compound of Formula I, such as AcDSSP, a chelating agent, and a peroxide source, without also including a bleach activator different from the acylated benzene sulfonate compound of Formula I, such as TAED) can have a colored, bleachable soil such as a tea stain removal rating measured in accordance with IKW Methods for Ascertaining the Cleaning Performance of Dishwasher Detergents (Part B, updated 2005) modified to consider only tea stain removal in a range from 8 to 10, for example from 9 to 10.

In some embodiments, dishware washed using the dishwashing detergent according to these embodiments including an acylated benzene sulfonate compound of Formula I (e.g., including an acylated benzene sulfonate compound of Formula I, such as AcDSSP, a chelating agent, and a peroxide source, without also including a bleach activator different from the acylated benzene sulfonate compound of Formula I, such as TAED) can have a persistent burnt soil such as a burnt skim milk soil removal rating measured in accordance with IKW Methods for Ascertaining the Cleaning Performance of Dishwasher Detergents (Part B, updated 2005) modified to consider only burnt skim milk removal in a range from 5 to 9, for example from 6 to 8, and as another example from 6 to 7.

In some embodiments, dishware washed using the dishwashing detergent according to these embodiments including an acylated benzene sulfonate compound of Formula I (e.g., including an acylated benzene sulfonate compound of Formula I, such as AcDSSP, a chelating agent, and a peroxide source, without also including a bleach activator different from the acylated benzene sulfonate compound of Formula I, such as TAED) can have a dried, starchy soil such as a cooked pasta soil removal rating measured in accordance with IKW Methods for Ascertaining the Cleaning Performance of Dishwasher Detergents (Part B, updated 2005) modified to consider only cooked pasta removal in a range from 8 to 10, for example from 9 to 10.

In some embodiments, dishware washed using the dishwashing detergent according to these embodiments including an acylated benzene sulfonate compound of Formula I (e.g., including an acylated benzene sulfonate compound of Formula I, such as AcDSSP, a chelating agent, and a peroxide source, without also including a bleach activator different from the acylated benzene sulfonate compound of Formula I, such as TAED) can have a dried protein soil such as an egg yolk soil removal rating measured in accordance with IKW Methods for Ascertaining the Cleaning Performance of Dishwasher Detergents (Part B, updated 2005) modified to consider only egg yolk removal in a range from 75% to 95%, for example from 80% to 90%.

In the foregoing, examples of embodiments of the present invention have been disclosed. The present invention is not limited to such exemplary embodiments. While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents.

In the foregoing, descriptions of sequences of steps or other actions are described for purposes of providing examples, and not for the purpose of limiting the scope of this disclosure (e.g., where appropriate, steps or actions may be performed in different sequences than described above, and steps and actions may be omitted and/or added). Unless otherwise noted, specific terms have been used in a generic and descriptive sense and not for purposes of limitation.

All numerical values and percentages provided throughout this disclosure can be approximate, and for each range specified in this disclosure, all values (including end points) within the range and all subranges within the range are also disclosed. Those of ordinary skill in the art will also readily understand that, in different implementations of the features of this disclosure, reasonably different engineering tolerances, precision, and/or accuracy (for example with respect to numerical value(s)) may be applicable and suitable for obtaining the desired result. Those of ordinary skill will also readily understand the meaning, usage, etc. herein of terms such as "substantially," "about," "approximately," and the like. As non-limiting examples, the skilled artisan will understand that all numeric values (including end points within a range and all subranges within the ranges, and also including values modified with the term "about," "substantially," "approximately," etc.) unless otherwise defined herein can indicate that a numeric value can vary by plus or minus 25%, for example plus or minus 20%, for example plus or minus 15%, for example plus or minus 10%, for example plus or minus 5%, for example plus or minus 4%, for example plus or minus 3%, for example plus or minus 2%, for example plus or minus 1%, for example plus or minus less than 1%, for example plus or minus 0.5%, for example less than plus or minus 0.5%, including all values and subranges therebetween for each of the above ranges.

As used herein (e.g., in the claims), the word "comprising" does not exclude other elements or steps. As used herein, indefinite articles "a" and "an" refer to at least one ("a" and "an" does not exclude a plurality and can refer to singular and/or plural element(s)).

As used herein, the phrase "and/or" includes any and all combinations of one or more of the associated listed items (e.g., can refer to elements that are conjunctively present in some embodiments and elements that are disjunctively present in other embodiments), and in some embodiments optionally in combination with other elements not specifically identified by the "and/or" phrase. As non-limiting examples, "A and/or B" can refer in some embodiments to A without B; in some embodiments to B without A; in some embodiments to both A and B; etc.

As used herein, the phrase "at least one" in reference to a list of one or more elements can refer to at least one element selected from any one or more of the elements in the list of elements, but not necessarily including at least one of each and every element specifically listed within the list of elements and not excluding any combinations of elements in the list of elements. In some embodiments, elements may be optionally present other than the elements specifically identified within the list of elements to which the phrase "at least one" refers, whether related or unrelated to those elements specifically identified. As non-limiting examples, "at least one of A and B"; "at least one of A or B"; and/or "at least one of A and/or B" can refer in some embodiments to at least one, optionally including more than one, A, with no B present (and optionally including elements other than B); in some embodiments to at least one, optionally including more than more one, B, with no A present (and optionally including elements other than A); in some embodiments to at least one, optionally including more than one, A, and at least one, optionally including more than one, B (and optionally including other elements); etc.

That which is claimed is:

1. An acylated benzene sulfonate additive that functions as both a chelating agent and a bleach activator for cleaning compositions, the additive comprising a compound having a structure of Formula Ia:

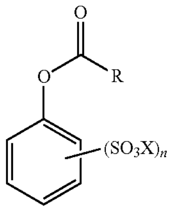

wherein:

R is hydrogen or a C1 to C11 alkyl, each X is independently an alkali metal ion, an alkaline earth metal ion, and/or a quaternary ammonium cation, and n is 2 or 3.

2. The additive according to claim 1, wherein R is hydrogen or C1 to C3 alkyl.

3. The additive according to claim 1, wherein R is methyl.

4. The additive according to claim 1, wherein X is Na.

5. The additive according to claim 1, wherein X is K.

6. The additive according to claim 1, wherein:

R is hydrogen or methyl, each X is an alkali metal ion, n is 2, and

—$SO_3X$ is substituted on positions 2 and 4 of the benzene ring.

7. The additive according to claim 1, wherein:

R is hydrogen or methyl, each X is an alkali metal ion, n is 3, and

—$SO_3X$ is substituted on positions 2, 4, and 6 of the benzene ring.

8. The additive according to claim 1, wherein the additive has the structure:

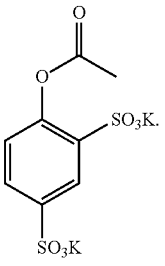

9. The additive according to claim 1, wherein the additive has the structure:

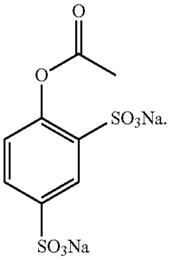

10. An automatic dishwasher (ADW) detergent composition comprising:

(i) an acylated benzene sulfonate additive that functions as both a chelating agent and a bleach activator comprising a compound having a structure of Formula Ia:

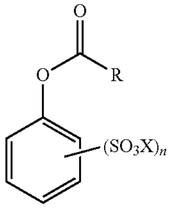

wherein:

R is hydrogen or a C1 to C11 alkyl, each X is independently an alkali metal ion, an alkaline earth metal ion, and/or a quaternary ammonium cation, and n is 2 or 3; and (ii) a peroxide source.

11. The automatic dishwasher (ADW) detergent composition according to claim 10, comprising the acylated benzene sulfonate in an amount of 0.1 to 25% by weight based on the total weight of the automatic dishwasher (ADW) detergent composition.

12. The automatic dishwasher (ADW) detergent composition according to claim 10, comprising the acylated benzene sulfonate in an amount of 0.1 to 10% by weight based on the total weight of the automatic dishwasher (ADW) detergent composition.

13. The automatic dishwasher (ADW) detergent composition according to claim 10, further comprising an additional chelating agent.

14. The automatic dishwasher (ADW) detergent composition according to claim 10, further comprising an additional bleach activator.

15. The automatic dishwasher (ADW) detergent composition according to claim 10, further comprising an additional chelating agent and an additional bleach activator.

16. The automatic dishwasher (ADW) detergent composition according to claim 10, wherein the automatic dishwasher (ADW) detergent does not include an additional bleach activator.

17. The automatic dishwasher (ADW) detergent composition according to claim 10, further comprising an additional chelating agent, wherein the automatic dishwasher (ADW) detergent does not include an additional bleach activator.

18. The automatic dishwasher (ADW) detergent composition according to claim 10, wherein the automatic dishwasher (ADW) detergent composition comprises no greater than 2% by weight of the acylated benzene sulfonate and no greater than 15% by weight of an additional chelating agent, each based on the total weight of the automatic dishwasher (ADW) detergent composition.

19. The automatic dishwasher (ADW) detergent composition according to claim 18, wherein the automatic dishwasher (ADW) detergent does not include an additional bleach activator.

20. The automatic dishwasher (ADW) detergent composition according to claim 10, wherein:

R is hydrogen or methyl, each X is an alkali metal ion, n is 2, and

—$SO_3X$ is substituted on positions 2 and 4 of the benzene ring.

21. The automatic dishwasher (ADW) detergent composition according to claim 10, wherein:

R is hydrogen or methyl, each X is an alkali metal ion, n is 3, and

—$SO_3X$ is substituted on positions 2, 4, and 6 of the benzene ring.

22. The automatic dishwasher (ADW) detergent composition according to claim 10, wherein the additive has the structure:

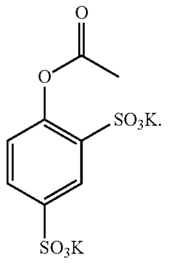

23. The automatic dishwasher (ADW) detergent composition according to claim 10, wherein the additive has the structure:

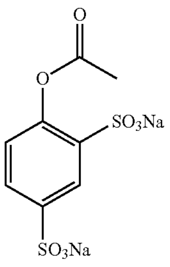

24. A method of cleaning glassware, dishware and/or silverware, comprising:

supplying an automatic dishwasher (ADW) detergent composition to an automatic dishwasher including glassware, dishware and/or silverware, wherein:

the automatic dishwasher (ADW) detergent composition comprises an acylated benzene sulfonate additive and a peroxide source, and the acylated benzene sulfonate additive functions as both a chelating agent and a bleach activator and comprises a compound having a structure of Formula Ia:

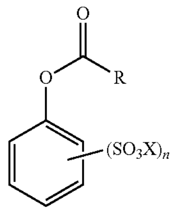

wherein:

R is hydrogen or a C1 to C11 alkyl, each X is independently an alkali metal ion, an alkaline earth metal ion, and/or a quaternary ammonium cation, and n is 2 or 3; and operating the automatic dishwasher.

25. The method according to claim 24, wherein:

R is hydrogen or methyl, each X is an alkali metal ion, n is 2, and

—$SO_3X$ is substituted on positions 2 and 4 of the benzene ring.

26. The method according to claim 24, wherein:

R is hydrogen or methyl, each X is an alkali metal ion, n is 3, and

—$SO_3X$ is substituted on positions 2, 4, and 6 of the benzene ring.

27. The method according to claim 24, wherein the additive has the structure:

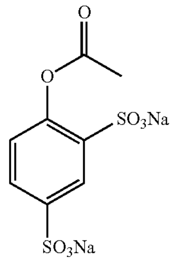

28. The method according to claim 27, wherein:

the automatic dishwasher (ADW) detergent composition comprises no greater than 2% by weight of the acylated benzene sulfonate and no greater than 15% by weight of an additional chelating agent, each based on the total weight of the automatic dishwasher (ADW) detergent composition;

glassware is present in the automatic dishwasher; and operating the automatic dishwasher comprises washing the glassware with the automatic dishwasher (ADW) detergent composition to provide glassware having a spot and/or film rating of 3.0 or less, as measured in accordance with ASTM D3556-14.

29. The method according to claim 27, wherein:

the automatic dishwasher (ADW) detergent composition comprises no greater than 2% by weight of the acylated benzene sulfonate and no greater than 15% by weight of an additional chelating agent, each based on the total weight of the automatic dishwasher (ADW) detergent composition;

dishware is present in the automatic dishwasher; and operating the automatic dishwasher comprises washing the dishware with the automatic dishwasher (ADW) detergent composition to provide dishware having:

a tea stain removal rating in a range from 8 to 10 measured in accordance with IKW Methods for Ascertaining the Cleaning Performance of Dishwasher Detergents (Part B, updated 2005) modified to consider only tea stain removal; and/or a burnt skim milk soil removal rating in a range from 5 to 9 measured in accordance with IKW Methods for Ascertaining the Cleaning Performance of Dishwasher Detergents (Part B, updated 2005) modified to consider only burnt skim milk soil removal; and/or a cooked pasta soil removal rating in a range from 8 to 10 measured in accordance with IKW Methods for Ascertaining the Cleaning Performance of Dishwasher Detergents (Part B, updated 2005) modified to consider only cooked pasta soil removal; and/or an egg yolk soil removal rating in a range from 75% to 95% measured in accordance with IKW Methods for Ascertaining the Cleaning Performance of Dishwasher Detergents (Part B, updated 2005) modified to consider only egg yolk soil removal.

* * * * *